(12) United States Patent
Ostiguy et al.

(10) Patent No.: US 10,003,803 B1
(45) Date of Patent: Jun. 19, 2018

(54) MOTION-BASED ADAPTIVE QUANTIZATION

(71) Applicant: MATROX GRAPHICS INC., Dorval (CA)

(72) Inventors: Jean-Jacques Ostiguy, Montreal (CA); Simon Garneau, Coteau-du-Lac (CA); Bernard Antaki, Montreal (CA); Alain Champenois, Montreal (CA); Khalil Mawassi, Dorval (CA); Nicolas Jean, Dorval (CA)

(73) Assignee: MATROX GRAPHICS INC., Dorval, Quebec (CA)

( * ) Notice: Subject to any disclaimer, the term of this patent is extended or adjusted under 35 U.S.C. 154(b) by 0 days. days.

(21) Appl. No.: 15/412,818

(22) Filed: Jan. 23, 2017

Related U.S. Application Data

(63) Continuation-in-part of application No. 13/670,587, filed on Nov. 7, 2012, now Pat. No. 9,621,900.

(60) Provisional application No. 61/625,995, filed on Apr. 18, 2012.

(51) Int. Cl.
- *H04N 11/02* (2006.01)
- *H04N 19/124* (2014.01)
- *H04N 19/172* (2014.01)
- *H04N 19/51* (2014.01)

(52) U.S. Cl.
CPC ......... *H04N 19/124* (2014.11); *H04N 19/172* (2014.11); *H04N 19/51* (2014.11)

(58) Field of Classification Search
CPC ..... H04N 19/00472; H04N 21/234309; H04N 7/26941
USPC ......................................................... 375/240
See application file for complete search history.

(56) References Cited

U.S. PATENT DOCUMENTS

| | | | |
|---|---|---|---|
| 5,309,292 A | 5/1994 | Takakura |
| 5,473,479 A | 12/1995 | Takakura |
| 6,108,487 A | 8/2000 | Takeda |
| 6,256,423 B1 | 7/2001 | Krishnamurthy et al. |
| 6,864,909 B1 | 3/2005 | Horowitz |
| 6,895,048 B2 | 5/2005 | Boice et al. |
| 6,912,255 B2 | 6/2005 | Drezner et al. |

(Continued)

OTHER PUBLICATIONS

Final Office Action for U.S. Appl. No. 13/670,587, dated May 18, 2016, 19 pages.

(Continued)

*Primary Examiner* — Andy Rao
*Assistant Examiner* — Zaihan Jiang
(74) *Attorney, Agent, or Firm* — Nicholson De Vos Webster & Elliott LLP

(57) ABSTRACT

A method and apparatus for compressing a data stream comprising a plurality of pictures are described. A first quantization parameter (QP) from a plurality of QPs is determined, for a static region in a current picture. The plurality of QPs change in accordance with a multi-step change from a start QP to a target QP and each one of the plurality of QPs is to be applied to a respective one from successive static regions in successive pictures. In response to determining that the static region is to be compressed based upon an inter prediction mode, compression of the static region is caused based upon the first QP; and in response to determining that the static region is to be compressed based upon an intra prediction mode, compression of the static region is caused based upon a minimum QP.

14 Claims, 16 Drawing Sheets

(56) References Cited

U.S. PATENT DOCUMENTS

| | | | |
|---|---|---|---|
| 7,085,322 B2 | 8/2006 | Ngai et al. | |
| 7,403,562 B2 | 7/2008 | Yang et al. | |
| 7,551,789 B2 | 6/2009 | Tu et al. | |
| 7,680,182 B2 | 3/2010 | Toma et al. | |
| 7,869,661 B2 | 1/2011 | Uchibayashi et al. | |
| 7,916,960 B2 | 3/2011 | Mizuno | |
| 8,000,393 B2 | 8/2011 | Tanaka | |
| 8,064,517 B1* | 11/2011 | Viscito | H04N 19/176 375/240.03 |
| 8,086,052 B2 | 12/2011 | Toth et al. | |
| 8,165,202 B1* | 4/2012 | Yonemoto | H04N 19/149 375/240.03 |
| 8,189,668 B2 | 5/2012 | Hong et al. | |
| 8,401,082 B2 | 3/2013 | Ye et al. | |
| 8,526,488 B2 | 9/2013 | Zheludkov et al. | |
| 8,635,357 B2 | 1/2014 | Ebersviller et al. | |
| 8,737,469 B1 | 5/2014 | Huang et al. | |
| 2003/0133169 A1* | 7/2003 | Uchibayashi | H04N 19/197 358/426.07 |
| 2004/0028143 A1 | 2/2004 | Schoenblum | |
| 2004/0184532 A1 | 9/2004 | Juri et al. | |
| 2005/0254577 A1 | 11/2005 | Ando | |
| 2007/0081589 A1 | 4/2007 | Kim et al. | |
| 2007/0195888 A1 | 8/2007 | Sabeti | |
| 2008/0123970 A1 | 5/2008 | Ozaki et al. | |
| 2008/0165852 A1 | 7/2008 | Zhang | |
| 2008/0181522 A1 | 7/2008 | Hosaka et al. | |
| 2009/0092184 A1 | 4/2009 | Wu et al. | |
| 2009/0213930 A1 | 8/2009 | Ye et al. | |
| 2009/0296808 A1 | 12/2009 | Regunathan et al. | |
| 2010/0135397 A1* | 6/2010 | Tanaka | H04N 19/139 375/240.16 |
| 2010/0135489 A1 | 6/2010 | Ziesler | |
| 2011/0026844 A1 | 2/2011 | Francois et al. | |
| 2011/0150085 A1 | 6/2011 | Andrijanic et al. | |
| 2011/0206121 A1 | 8/2011 | Takada et al. | |
| 2011/0249727 A1 | 10/2011 | Bock et al. | |
| 2011/0249728 A1 | 10/2011 | Bock et al. | |
| 2012/0183039 A1 | 7/2012 | Rajamani et al. | |

OTHER PUBLICATIONS

Non-Final Office Action for U.S. Appl. No. 13/670,587, dated Feb. 2, 2015, 16 pages.
Non-Final Office Action for U.S. Appl. No. 13/670,587, dated Nov. 16, 2015, 19 pages.
Final Office Action for U.S. Appl. No. 13/670,587, dated Jun. 8, 2015, 19 pages.
Tang, "Spatiotemporal Visual Considerations for Video Coding", IEEE Transactions on multimedia, vol. 9, No. 2, Feb. 2007, pp. 231-238.
Kwon et al., "Rate Control for H.264 Video With Enhanced Rate and Distortion Models", IEEE transactions on circuits for video technology, vol. 17, No. 5, May 2007, pp. 517-529.
Notice of Allowance for U.S. Appl. No. 13/670,587, filed Nov. 29, 2016, 9 pages.
Advisory Action from U.S. Appl. No. 13/622,794, dated Apr. 17, 2015, 3 pages.
Advisory Action from U.S. Appl. No. 13/670,587, dated Aug. 5, 2015, 3 pages.
Advisory Action from U.S. Appl. No. 13/670,587, dated Aug. 18, 2016, 5 pages.
Final Office Action from U.S. Appl. No. 13/622,794, dated Jan. 15, 2015, 12 pages.
Ghandi M M., et al., "A Lagrangian Optimized Rate Control Algorithm for the 1-1.264/AVC Encoder," International Conference on Image Processing, Oct. 2004, vol. 1, pp. 123-126.
He Z., et al., "Linear Rate Control and Optimum Statistical Multiplexing for H.264 Video Broadcast," IEEE Transactions on Multimedia, Nov. 2008, vol. 10, No. 7, pp. 1237-1249.
Kwon, et al., "A Novel Two-Stage Rate Control Scheme for H.264", IEEE International Conference on Multimedia and Expo, Jul. 2006, pp. 673-676.
Kwon, et al., "Rate Control for H.264 Video With Enhanced Rate and Distortion Models," IEEE Transactions on Circuits and Systems for Video Technology, May 2007, vol. 17, No. 5, pp. 517-529.
Li Z G., et al., "Adaptive Rate Control for H.264," Journal of Visual Communication and Image Representation, 2006, vol. 17, pp. 376-406.
Ma S., et al., "Rate-Distortion Analysis for 1-1.264/AVC Video Coding and its application to Rate Control," IEEE Transactions on Circuits and Systems for Video Technology, Dec. 2005, vol. 15, No. 12, pp. 1533-1544.
Merritt L., et al., "Improved Rate Control and Motion Estimation for H.264 Encoder," IEEE International Conference on Image Processing, Oct. 2007, vol. 5, pp. V309-V312.
Milani S., et al., "A Rate Control Algorithm for the H.264 Encoder", Dept. of Information Engineering, University of Padova, Italy, 6 pages.
Non-final Office Action from U.S. Appl. No. 13/622,794, dated Aug. 27, 2015, 11 pages.
Non-final Office Action from U.S. Appl. No. 13/622,794, dated Sep. 30, 2014, 13 pages.
Non-final Office Action from U.S. Appl. No. 14/508,518, dated Jun. 33, 2015, 5 pages.
Non-Final Office Action from U.S. Appl. No. 15/412,808, dated Jul. 27, 2017, 22 pages.
Notice of Allowance from U.S. Appl. No. 13/622,785, dated Jun. 24, 2014, 8 pages.
Notice of Allowance from U.S. Appl. No. 13/622,794, dated Jan. 19, 2016, 9 pages.
Notice of Allowance from U.S. Appl. No. 13/623,557, dated Feb. 26, 2015, 10 pages.
Notice of Allowance from U.S. Appl. No. 13/623,557, dated Nov. 12, 2014, 8 pages.
Notice of Allowance from U.S. Appl. No. 14/508,518, dated Aug. 27, 2015, 5 pages.
Reibman A R., et al., "Constraints on Variable Bit-Rate Video for ATM Networks," IEEE Transactions on Circuits and Systems for Video Technology, Dec. 1992, vol. 2, No. 4, pp. 361-372.
Richardson, "H.264 and MPEG-4 Video Compression: Video Coding for Next-generation Multimedia," Chapter 6, "H.264/MPEG4 Part 10," 2003, pp. 159-223.
Yi X., et al., "Improved H.264 Rate Control by Enhanced MAD-Based Frame Complexity Prediction," Journal of Visual communication and Image Representation (Special Issue on Emerging H.264/AVC Video Coding Standard), May 2005, Elsevier Science, pp. 1-14.

* cited by examiner

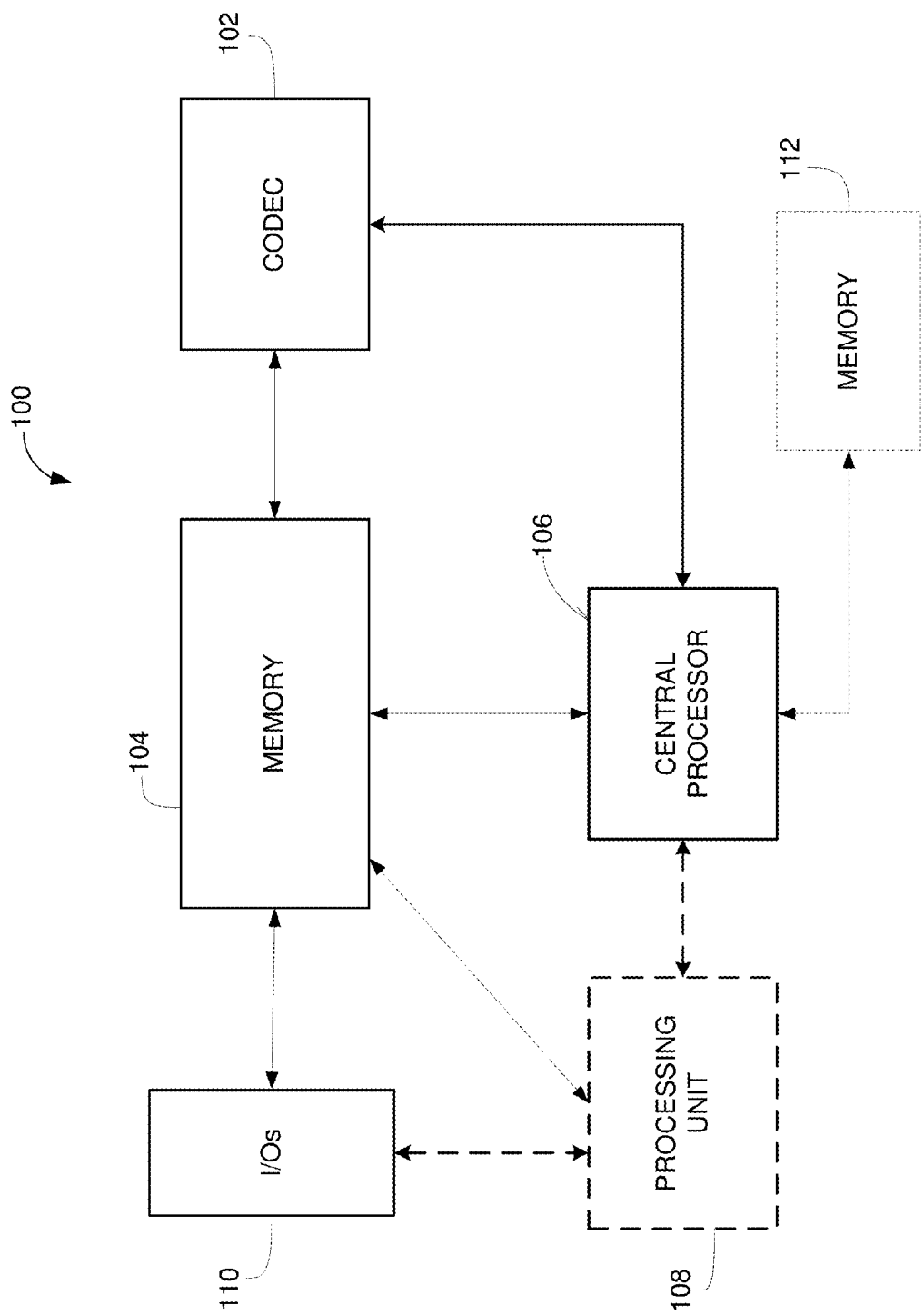

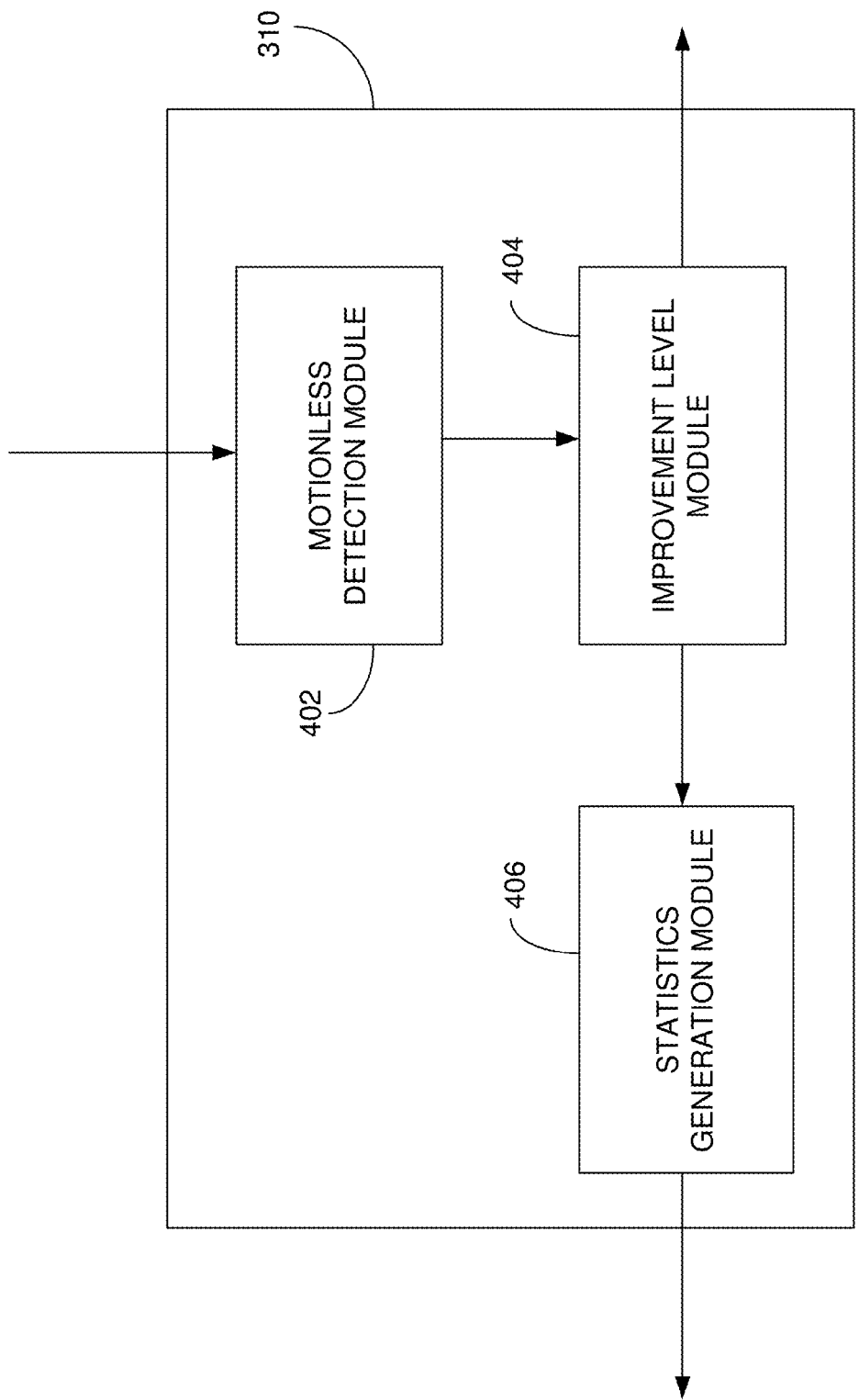

| QP | Max Regions to Improve |
|---|---|
| QP_start (e.g., 40) | - |
| QP1 (e.g., 38) | Max_1 |
| QP2 (e.g., 32) | Max_2 |
| ... | ... |
| QP_N-1 (e.g., 25) | Max_N-1 |
| QP_N (e.g., 51) | - |

FIGURE 8A

| Improvement Level | Max Regions to Improve |
|---|---|
| 0 | - |
| 1 | Max_1 |
| 2 | Max_2 |
| 3 | Max_3 |
| 4 | Max_4 |
| 5 | Max_5 |
| ... | ... |
| N-1 | Max_N-1 |
| N | Max_N |

FIGURE 8B

| Quantization Parameter(QP) | Minimum QP |
|---|---|
| QPstart (e.g., 45) | - |
| QP1 (e.g., 40) | QP1 (e.g., 40) |
| QP2 (e.g., 30) | QP1 (e.g., 40) |
| QPtarget (e.g., 20) | QP2 (e.g., 30) |
| QPend (e.g., 51) | QPtarget (e.g., 20) |

FIGURE 12A

| Improvement Level | Quantization Parameter(QP) | Minimum QP |
|---|---|---|
| 0 | Qpstart (e.g., 45) | - |
| 1 | 40 | 40 |
| 2 | 51 | 40 |
| 3 | 30 | 30 |
| 4 | 51 | 30 |
| 5 | QPtarget (e.g., 20) | 20 |
| 6 | QPend (e.g., 51) | 20 |

FIGURE 12B

MOTION-BASED ADAPTIVE QUANTIZATION

CROSS-REFERENCE TO RELATED APPLICATIONS

This application is a continuation-in-part of application Ser. No. 13/670,587, filed Nov. 7, 2012, which claims the benefit of U.S. Provisional Application No. 61/625,995 filed on Apr. 18, 2012, which are hereby incorporated by reference.

TECHNICAL FIELD

The present invention relates to the field of image data compression and decompression.

BACKGROUND OF THE ART

Applications that use image data are found in many different fields, such as security control, television, broadcasting, social media, video telephony, videoconferencing, wireless devices, streaming media applications, remote desktop, cloud computing, and others. Image data may refer to video data, computer generated graphics data, desktop data, or any other type of data depicting a visual perception. Image data may be stored in a variety of medium (DVDs, Blu-Ray disks, mobile devices, memory sticks, hard-drive, etc) and may be transmitted through a variety of medium such as fiber optics, IP connections, USB, satellite, etc.

Image compression and decompression are performed to reduce the consumption of expensive resources, such as storage space or transmission bandwidth. In general, a codec (encoder/decoder) includes an encoder used to convert the source data into a compressed form occupying a reduced space prior to storage or transmission. The codec may also comprise a decoder which receives compressed data and converts it into a decompressed image or stream ready for display or for further processing. The codec may be a software implementation, a hardware implementation, or a combination thereof.

Two types of encoding exist, namely lossy and lossless. A lossy encoding process achieves compression not only by removing truly redundant information from the bit stream but also by making small quality compromises in ways that are intended to be minimally perceptible. In particular, a quantization parameter (QP) regulates how much spatial detail is saved. When QP is very small, almost all of the detail is retained. As QP increases, some of the detail is aggregated so that the bit rate drops, at the expense of some increase in distortion and some loss of quality. The QP may be adapted from a region of a picture to another region according to application-based schemes as Region of Interest (ROI) and/or according to a Variance-based Adaptive quantization scheme (VAQ).

There is a particular type of video streaming where portions of frames are still or motionless, sometimes referred to as "desktop streaming". Still portions comprise sharper contrasts and more defined edges. Fast moving desktop content needs less visual quality since the eye will barely see the details. Static content needs to be improved in quality as details stand out and are expected to be sharp. There is therefore a need for a compression scheme that can reconcile the opposing requirements of desktop streaming.

SUMMARY

There is described herein motion-based adaptive quantization for compressing video streams. Motionless portions of pictures are detected and the compression quality of these portions is increased while the compression quality of non-motionless portions is decreased. The QP of a portion of image data, such as a macroblock, is modified for successive motionless portions from a start QP to a target QP in accordance with a multi-step change.

In this specification, the term "macroblock" is intended to mean a partition of a picture representing image data. For example, a macroblock may correspond to a 16×16 sample region of a picture (16×16 luma samples, 8×8 Cb and 8×8 Cr samples). Other partitionings will be readily understood by those skilled in the art. A picture may be coded as one or more slices, each containing an integral number of macroblocks from 1 to the total number of macroblocks in a picture (1 slice per picture). The number of macroblocks per slice need not be constant within a picture.

In accordance with a general aspect, a method for compressing a data stream including a plurality of pictures is described. The method includes determining, for a static region in a current picture from the plurality of pictures, a first quantization parameter (QP) from a plurality of QPs, where the plurality of QPs change in accordance with a multi-step change from a start QP to a target QP and each one of the plurality of QPs is to be applied to a respective one from successive static regions in successive pictures, and a location of each one of the successive static regions within its respective successive picture is the same as a location of the static region within the current picture; in response to determining that the static region is to be compressed based upon an inter prediction mode, causing compression of the static region based upon the first QP; and in response to determining that the static region is to be compressed based upon an intra prediction mode, causing compression of the static region based upon a minimum QP from the plurality of QPs, where the minimum QP has a value that is smaller or equal than each one of a subset of QPs from the plurality of QPs, and the subset of QPs includes QPs that were selected to respectively compress one or more previous regions in one or more previous pictures preceding the current picture in a compression order.

One general aspect includes a non-transitory computer readable storage medium that provide instructions, which when executed by a processor, cause said processor to perform operations including: determining, for a static region in a current picture from a plurality of pictures, a first quantization parameter (QP) from a plurality of QPs, where the plurality of QPs change in accordance with a multi-step change from a start QP to a target QP and each one of the plurality of QPs is to be applied to a respective one from successive static regions in successive pictures, and a location of each one of the successive static regions within its respective successive picture is the same as a location of the static region within the current picture; in response to determining that the static region is to be compressed based upon an inter prediction mode, causing compression of the static region based upon the first QP; and in response to determining that the static region is to be compressed based upon an intra prediction mode, causing compression of the static region based upon a minimum QP from the plurality of QPs, where the minimum QP has a value that is smaller or equal than each one of a subset of QPs from the plurality of QPs, and the subset of QPs includes QPs that were selected to respectively compress one or more previous regions in one or more previous pictures preceding the current picture in a compression order.

BRIEF DESCRIPTION OF THE DRAWINGS

Further features and advantages of the present invention will become apparent from the following detailed description, taken in combination with the appended drawings, in which:

FIG. 1 is a block diagram of an exemplary system comprising a codec;

FIG. 4A is a block diagram of an exemplary MAQ unit of the prediction module of FIG. 3;

FIG. 8A illustrates an exemplary table including quantization parameters and associated limits for number of regions that can be improved to each quantization parameter in accordance with some embodiments.

FIG. 8B illustrates an exemplary table including improvement levels and associated limits for number of regions that can be improved to each level, in accordance with some embodiments.

FIG. 12A illustrates an exemplary table including quantization parameters and associated minimum QP that can be used to compress an Intra region in accordance with some embodiments.

FIG. 12B illustrates an exemplary table including improvement levels, quantization parameters and associated minimum QP that can be used to compress an Intra region in accordance with some embodiments.

It will be noted that throughout the appended drawings, like features are identified by like reference numerals.

DETAILED DESCRIPTION

Figure 2A:
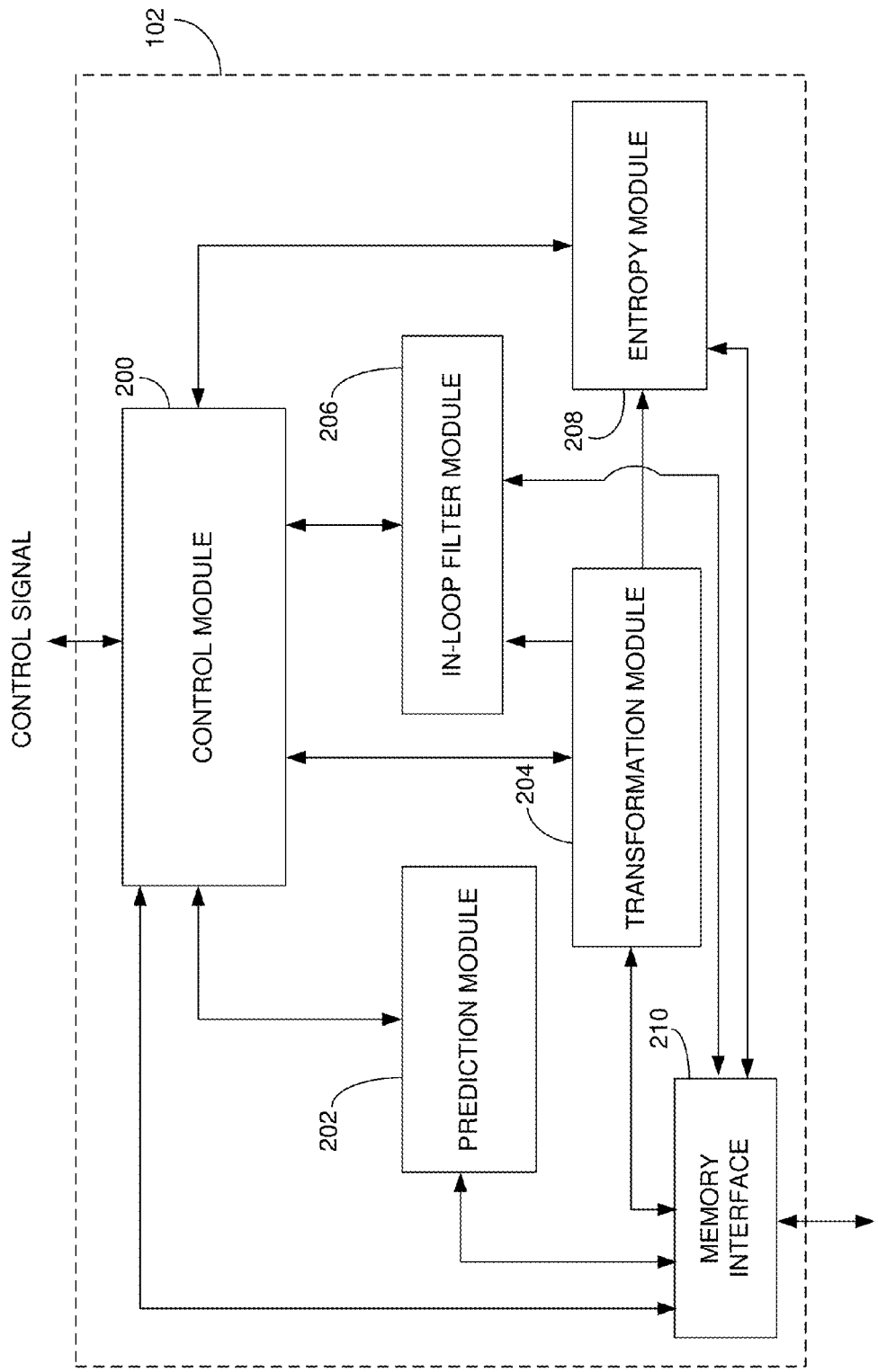
FIG. 2A is a block diagram of an exemplary codec for compressing image data.

FIG. 1 illustrates a system 100 comprising a codec 102, a memory 104, and a central processor 106. The memory 104 accessible by the central processor 106 receives and stores data. The memory 104 may be a main memory of the central processor 106, such as a high speed Random Access Memory (RAM), or a local memory. The central processor 106 may access the memory 104 to retrieve data.

In some embodiments, the system 100 may also comprise one or more processing unit 108 connected to the memory 104. This additional processing unit 108 may correspond to a graphics processing unit, a video processing unit, a display engine, an audio processor, or any other type of processing unit known to those skilled in the art. A plurality of input/output interfaces 110 may also be provided to allow the system 100 to receive and transmit data from/to external modules and/or peripheral devices. Also illustrated in FIG. 1 is a second memory 112 connected to the central processor 106.

The components of the system 100 may be packaged in various manners. For example, the central processor 106 and the codec 102 may be included in a System-on-a-chip (SoC). The codec 102 may be included in a chip while the central processor 106 is provided externally to the chip. The memory 104 and the codec 102 may be provided in an SoC or a chip. The codec 102 may be included in an integrated circuit or a chip and the memory 104 may be external to the integrated circuit. The codec 102, the central processor 106, the processing unit 108 and the Input/Output interfaces 110 may be connected to the memory 104 through a memory controller (not shown). The codec 102 may also be located remotely from the central processor 106 with the two components being part of a network.

The image data to be compressed/decompressed may be stored in memory 104, memory 112 or any other memory operatively connected to codec 102, directly or indirectly. If the image data is stored externally to the system 100, it may be copied into memory 104 or memory 112 before processing, by the codec 102 or by a dedicated module, such as a copy engine (not shown). The image data may correspond to a stream of pictures, a picture, and/or a portion of a picture. A picture may be a frame or a field. In some embodiments, a portion of a picture may correspond to one or more macroblocks. For example, a portion of a picture may be a slice.

The codec 102 may use one or more of a number of previously encoded pictures as a reference for motion-compensated prediction of each inter coded macroblock or macroblock partition. This enables the codec 102 to search for the best match for the current macroblock partition from a wider set of pictures than just the previously encoded picture. The codec may thus maintain one or more lists of reference pictures, containing pictures that have previously been encoded and decoded (occurring before and/or after the current picture in display order).

FIG. 2a is a block diagram of an exemplary embodiment of the codec 102 for encoding an uncompressed bit stream into a compressed bit stream. In this embodiment, a control module 200 acts as an initial input point for the codec 102. A control signal may be received by the control module 200 in order to trigger compression of the image data. The control signal may be generated by an application running on central processor 106, processing unit 108, or another processing unit operatively connected to codec 102, directly or indirectly. The application may request that an entire stream of pictures, a portion of a stream of pictures, a picture, or a portion of a picture be compressed. In some embodiments, the request for compression may be broken down into a plurality of requests for compressing portions of the stream. The plurality of requests may comprise one or more steps for configuring the codec 102 according to the application's initial request.

The control signal may comprise control information to allow the control module 200 to configure the various modules of the codec 102 with appropriate parameters in order to perform the requested task(s) of compressing image data. Configuration may be performed in one or more steps, depending on the initial request and on the format of the request. Compression parameters such as picture resolution, output bit rate, picture type and coding functions may be provided to the control module 200 together with the request for compression or separately therefrom. Depending on the task, some of the modules may not need to be configured and may not be used to process data.

A prediction module 202, a transformation module 204, an in-loop filter module 206 and an entropy module 208 are each connected to a memory interface 210 in order to read and write data to memory 104 without passing through the control module 200. In the embodiment illustrated, the memory interface 210 is internal to the codec 102 while the memory 104 is external to the codec 102. In an alternative embodiment, both the memory interface 210 and the memory 104 are external to the codec 102. The transformation module 204 and the entropy module 208 may be connected together in order to pass information directly therebetween. The transformation module 204 may also be connected directly to the in-loop filter module 206. The prediction module 202, transformation module 204, in-loop filter module 206 and entropy module 208 are each connected to the control module 200 for configuration and control of the process.

In general, image data is stored in the memory 104 and requests are sent to the codec 102 to compress the image data. Following the receipt of the compression requests, the control module 200 of the codec 102 configures the prediction module 202 with appropriate parameters for processing the image data stored in memory 104. The prediction module 202 accesses the memory 104 through the memory interface 210, processes image data, and stores the result in the memory 104. In a second step the transformation module 204 is configured with appropriate parameters and retrieves data from the memory 104 in order to process it. In some embodiments data processed by the transformation module 204 is immediately transferred to the in-loop filter module 206 for processing without going through the memory 104. In other embodiments the transformation module 204 processes data and stores it to memory 104 before the in-loop filter module 206 accesses it. According to this embodiment, the in-loop filter module 206 reads the data from the memory 104, processes the data, and stores it back in memory. In a subsequent step, data is read from memory 104, processed by the entropy module 208, and stored back to the memory 104. In another embodiment, the entropy module 208 reads data from memory 104 and outputs processed data to an external module without going through memory 104.

Figure 2B:
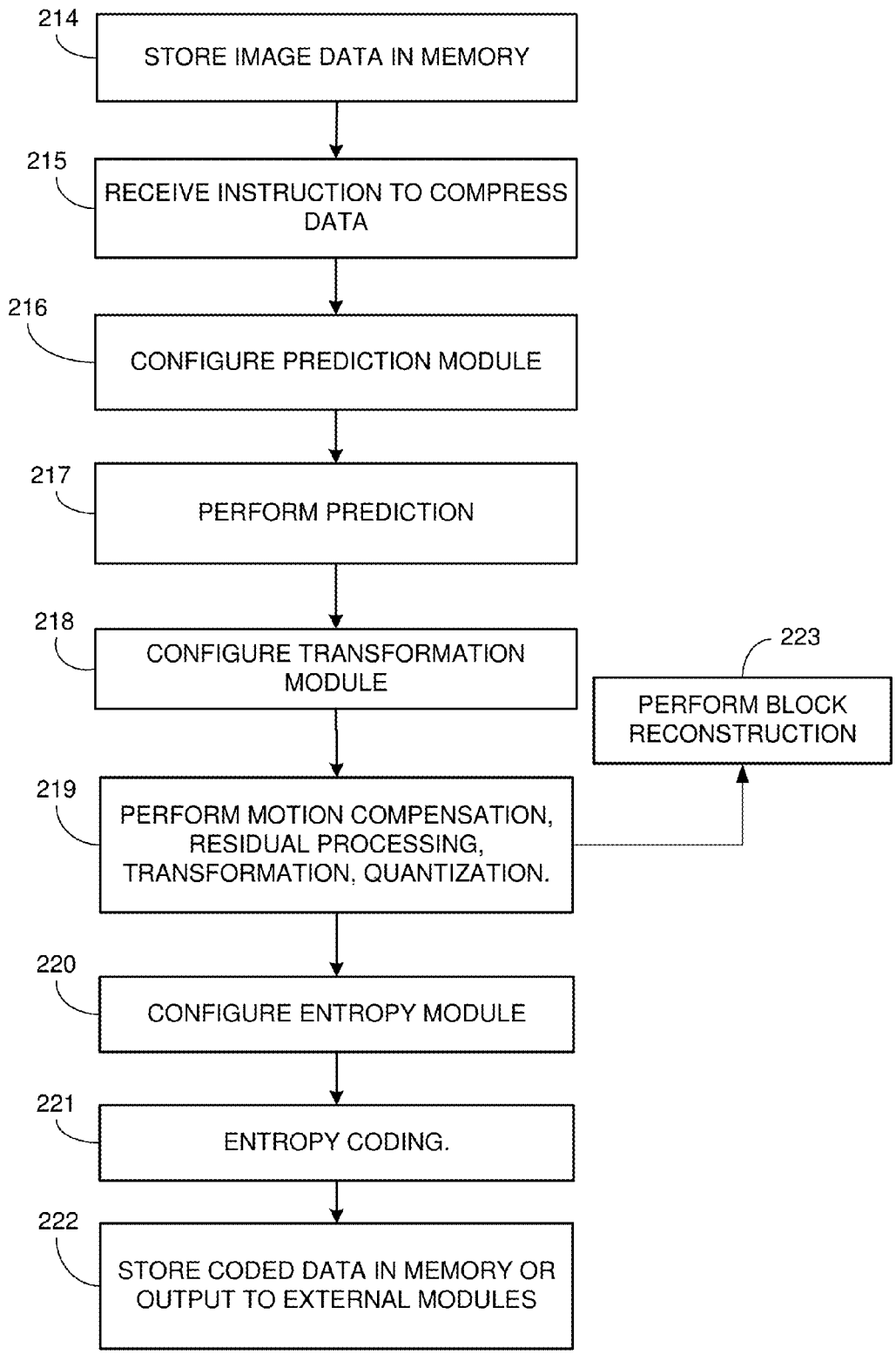
FIG. 2B is a flowchart of an exemplary method for compressing image data using the codec of FIG. 2A.

Referring to FIG. 2b, the processing steps performed within codec 102 for compressing image data are described in more detail in accordance with one embodiment. At step 214, image data is stored in memory 104. At step 215, the control module 200 receives parameters indicative of how image data should be processed along with a request to compress the image data. The parameters may comprise the address in memory of the image data that needs to be compressed, the resolution of the image data, the type of compression requested, a Group of Pictures (GOP), a desired output bit rate, etc. In some embodiments, the control module 200 may receive configuration parameters before receiving a request to process image data. These configuration parameters may be used to configure the different modules of the codec 102.

At step 216, the control module 200 configures the prediction module 202, through a communication path according to the received request. According to some embodiments, the prediction module 202 is a register-based engine comprising a set of registers and processing units, with access to the memory 104. The registers may be configured with information comprising the address of image data to be encoded, the number of reference pictures needed, coefficients representative of a quantization parameter (qp), a slice type (e.g. I, B, P), the number of macroblock divisions allowed for each macroblock of the image data, etc. In one embodiment the control module 200 configures the prediction module 202 to process a group of macroblocks. In another embodiment, the control module 200 configures the prediction module 202 to process a slice.

At step 217, the prediction module 202 accesses the image data in memory 104 and determines for each macroblock how the compression will be performed by the subsequent modules of the codec. For example, for a current macroblock the prediction module 202 may determine its corresponding predicted macroblock and a corresponding prediction type (i.e. intra or inter prediction). In some embodiments, the prediction module 202 outputs for a macroblock, at least one motion vector (or a motion vector difference) and an encoding mode (Inter or intra). The output data is stored in a buffer such as a prediction buffer (PB) in memory 104. The prediction module 202 may also output information related to a quantization parameter for processing of the macroblock in the transformation module 204 and other types of data such as a skip macroblock. This information is stored in memory 104. In some embodiments, the prediction module 202 may divide a macroblock into a plurality of sub-macroblocks and the processing is then performed for each sub-macroblock. The subdivision of a macroblock may be determined according to input parameters.

At step 218, the control module 200 configures the transformation module 204 to process image data. In some embodiments the control module 200 may also configure the in-loop filter module 206 at step 218. In other embodiments, the control module 200 configures the in-loop filter module 206 at a later step. In one example, the control module 200 configures the transformation module 204 with the address of the data to process, the address of at least one reference picture (in some embodiments, the transformation module may need to access more than one reference picture), a quantization parameter and other control parameters necessary to perform compression. In another example, the control module 200 configures the transformation module 204 with the address of the data to process, a quantization parameter and other control parameters necessary to perform compression. The data to be processed by the transformation module 204 may be retrieved from the prediction buffer (PB).

At step 219, the transformation module 204, performs motion compensation or intra prediction, residual processing, frequential transformation and quantization for each macroblock of the image data. Once the data is processed, it may be stored in memory 104 in a transformation buffer (TB). The transformation buffer may comprise for each processed macroblock a corresponding quantized macroblock, a corresponding motion vector(s) (or motion vector difference), a compression type associated with the quantized macroblock, partitioning information if a macroblock is partitioned, and may comprise additional parameters needed by the entropy module 208. The transformation module 204 may further perform a plurality of lossless encoding schemes at step 219.

In some embodiments, the transformation module 204 may reconstruct a macroblock as shown at step 223. In these embodiments, the transformation module 204 performs an inverse quantization on the previously obtained quantized macroblock. Further the transformation module 204 performs inverse frequential transformation and motion compensation and residual processing in order to obtain a reconstructed macroblock associated with the quantized macroblock and to the initial macroblock output to the transformation module 204 to be compressed. The reconstructed macroblock is finally stored in the memory 104 in a reconstructed buffer (RB). Data from the reconstructed buffer may be used as reference pictures during the compression of subsequent pictures. While the transformation module 204 is described as processing macroblocks, when a division of the macroblock is requested, the transformation module 204 processes each sub-macroblock of the macroblock.

According to some embodiments, step 223 may further comprise a step of filtering the reconstructed macroblocks with the in-loop filter module 206. More specifically, the in-loop filter module 206 accesses data from the reconstructed buffer (RB) to perform smoothing of sharp edges which can form between decoded macroblocks in order to improve visual quality of decompressed data. In these embodiments, the output of the in-loop filter module 206 is stored in the reconstructed buffer and is used as reference picture during the compression of subsequent macroblocks.

At step 220, the control module 200 configures the entropy module 208 to perform partial or complete lossless compression of the image data and to output a final encoded image data. At this step, the control module 200 may also generate a header which will be assembled with the data, once the data has finished being encoded by the entropy module 208. At step 221, the entropy module 208 reads data from the transformation buffer (TB). For each quantized macroblock and its associated data (such as a corresponding motion vector difference, a compression type and partitioning information), the entropy module 208 applies an entropy encoding algorithm. For example, the entropy module 208 may implement one of Context-based Adaptive Variable Length Coding (CAVLC) or Context-based Adaptive Binary Arithmetic Coding (CABAC) as defined in the H.264 standard. In other embodiments the entropy module 208 may implement any other suitable entropy coding algorithms. At a final step 222, the encoded image data is stored in memory 104 or output to external devices for further processing and/or transmission.

Figure 3:
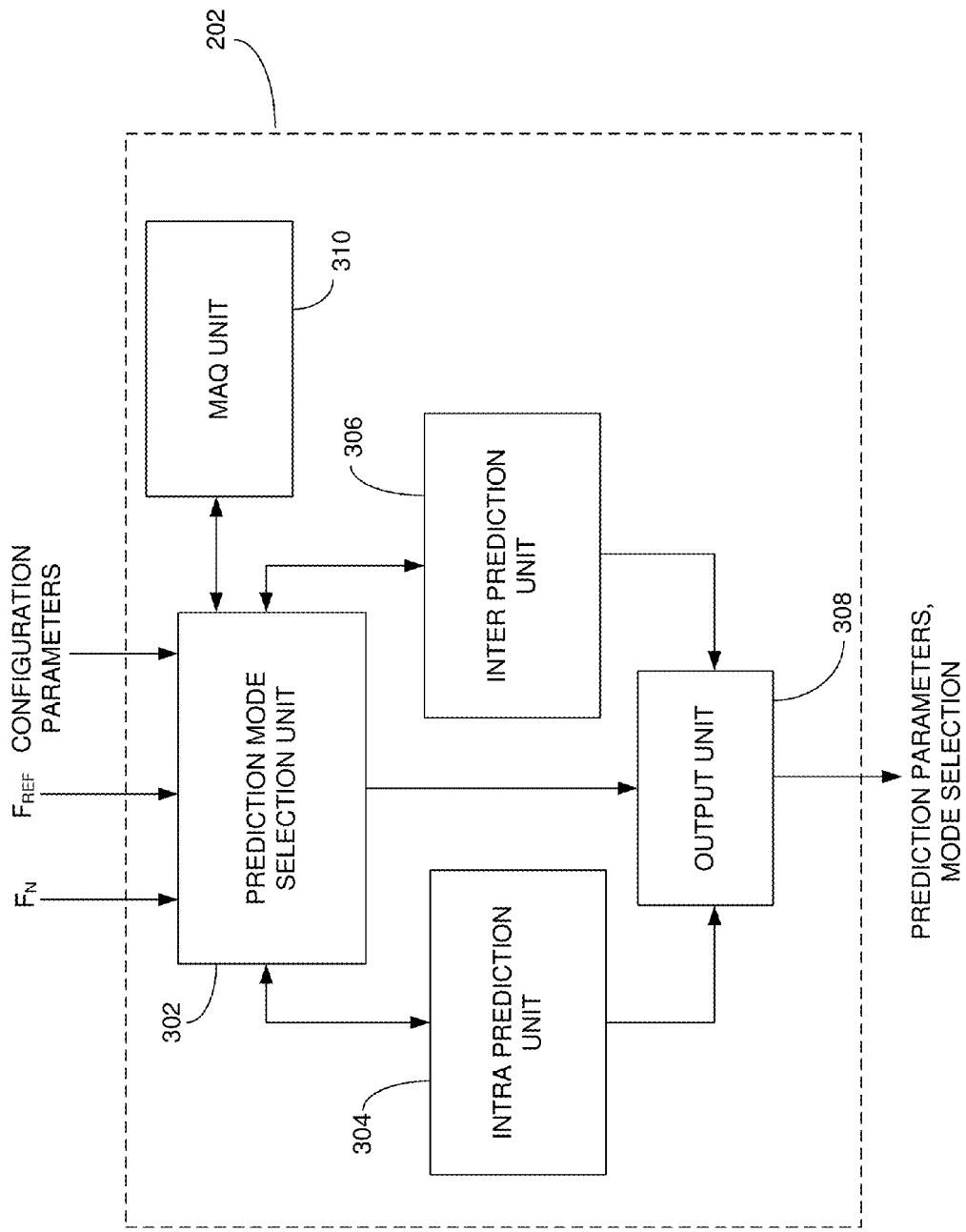
FIG. 3 is a block diagram of an exemplary prediction module of the codec of FIG. 2A.

FIG. 3 illustrates an exemplary embodiment for the prediction module 202. A prediction mode selection unit 302 receives configuration parameters, macroblock FN and reference pictures FREF, and chooses between an intra prediction mode and an inter prediction mode for the compression of the macroblock. If intra prediction is used, information contained only within the current picture may be used for the prediction. If inter prediction is used, information from a previously encoded picture may be used in the prediction. The selection of the prediction mode is made using a variety of factors, such that a difference between a prediction and the image data is minimized.

The selected mode is sent to an output unit 308. An intra prediction unit 304 is used to generate prediction parameters according to an intra mode, such as the partitioning of the macroblock. An inter prediction unit 306 is used to generate prediction parameters for an inter mode, such as the partitioning, motion vectors, and selected reference pictures. The prediction parameters from both the intra prediction unit 304 and the inter prediction unit 306 are provided to the output unit 308. In some embodiments, both sets of prediction parameters are output with the mode selection. Alternatively, only the prediction parameters corresponding to the selected mode are output from the prediction module 202.

The prediction module 202 may access the memory 104 to read the macroblock FN and reference pictures FREF. Once the macroblock has been processed, the resulting prediction parameters and mode selection may be written to memory 104 via memory interface 210. In other embodiments, the resulting prediction parameters and mode selection may be sent to the transformation module 204.

In accordance with some embodiments, the prediction module 202 also comprises an MAQ unit 310 for performing Motion-based Adaptive Quantization (MAQ). In addition the codec 102 may comprise an MAQ mode register to enable the MAQ. When the MAQ mode is enabled the codec 102 configures the prediction module 202, the transformation module 204 and the entropy module 208 with appropriate parameters to compress image data in accordance with motion-based adaptive quantization. In this mode, static (or motionless) macroblocks of image data are detected in each picture and the compression quality of the motionless macroblocks is improved in successive pictures. The quality improvement is performed in part by modifying the quantization parameter of each detected motionless macroblock and setting it to an appropriate value. The quality improvement is interrupted when a non-static macroblock is detected. When a new motionless macroblock is detected, the quality improvement scheme resumes and the quantization parameter varies again. The quality improvement scheme is performed during compression of the macroblock, without preprocessing, and in substantially real time reducing latency between the compression and the display of pictures when the compression and display of pictures are in the same order. The quantization parameter of each macroblock is adapted in order to obtain a customized and ideal compression quality for that macroblock.

Motion-based Adaptive Quantization may be performed on a picture by picture basis for subsets of pictures. In general, a data stream may comprise at least one picture, each picture comprising static (still) regions and non-static regions. A region of a picture may refer to a sub-set of a picture comprising a macroblock or a group of macroblocks. In one embodiment, MAQ may be performed on each macroblock such that each macroblock is separately encoded with an appropriate quantization parameter. In another embodiment, MAQ may be performed on a group of macroblocks comprising more than one macroblock, such that all macroblocks of the group are encoded with a common quantization parameter.

Figure 4B:
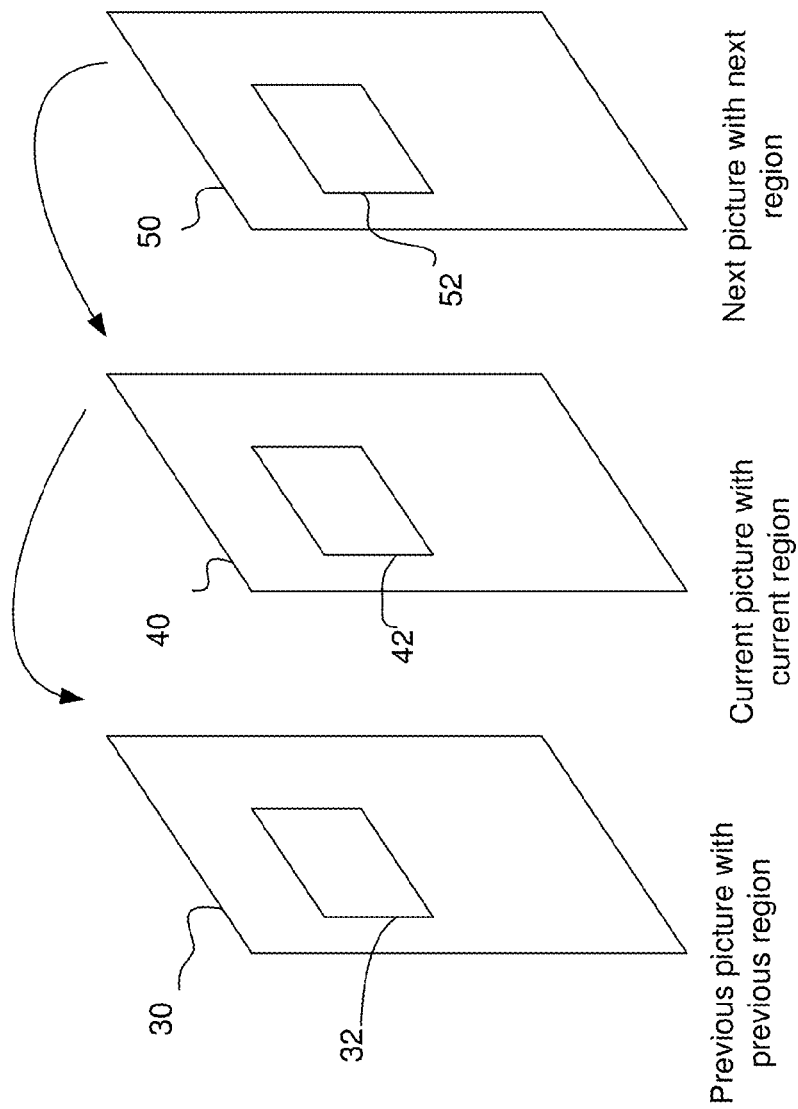
FIG. 4B is a schematic illustration of successive pictures having portions for compression.

FIG. 4b illustrates three successive pictures from a data stream to be compressed with codec 102. The pictures 30, 40 and 50 include regions 32, 42 and 52 respectively. Picture 30, including region 32, is first compressed with codec 102. At a second step the codec 102 compresses picture 40 and finally it compresses picture 50. Picture 50 is the next picture to be compressed after picture 40 and comprises region 52 which is located at the same position as region 42. Region 52 is referred to as "next region" relative to region 42. Regions 32, 42 and 52 are an example of successive regions located at the same location in successive pictures. Each region 32, 42 and 52 may comprise at least one macroblock.

MAQ will be described in reference to MAQ unit 310. Certain functions performed by the MAQ unit 310 may also be performed by other units in the prediction module 202 and/or in the transformation module 204. Therefore, already existing functional elements from the codec 102 may be used to implement one or more of the steps performed for motion-based adaptive quantization. For simplicity, the MAQ unit 310 is illustrated inside the prediction module 202 and separate from the prediction mode selection unit 302, intra prediction unit 304 and inter prediction unit 306. However, it should be noted that the MAQ unit 310 may reside entirely or partly in the prediction mode selection unit, the inter prediction unit 306 or another unit/module of the codec 102.

As illustrated in FIG. 4a, the MAQ unit 310 may comprise a motionless detection module 402, an improvement level module 404, and a statistics generation module 406. The motionless detection module 402 is illustrated as being inside the MAQ unit 310 for simplicity but may reside outside, as motion estimation and motion compensation may be performed in other sub-modules of the prediction module 202.

The motionless detection module 402 is adapted to determine whether a macroblock is motionless during its processing in the prediction module 202. This requires comparing each macroblock with a reference macroblock, namely a macroblock at a same position in a preceding picture, in order to detect change between the two macroblocks. In one embodiment, the change is detected by comparing the two macroblocks and verifying if they are substantially identical or not. A first reference picture is thus used to detect motionless macroblocks in a picture. In some embodiments, the same reference picture may be used to detect motionless macroblocks and for their compression in the prediction module 202 and the transformation module 204. In some embodiments, a second reference picture different from the first reference picture is used during the actual compression step of the motionless macroblocks. In some embodiments, compression standards such as H.264 may require the use of a reconstructed picture as reference during the compression of a macroblock. The first reference picture may be a source picture, e.g. a preceding picture before its compression, while the second reference picture may be a reconstructed picture, e.g. a preceding picture after compression and reconstruction. In some embodiments, the first reference picture may be discarded once the detection of motionless macroblocks has been completed in the prediction module 202, while the second reference picture is kept for use by the transformation module 204 for processing the macroblock. In some embodiments, the use of source pictures for the detection of static macroblocks reduces significantly the detection of false non-static content.

In some embodiments, static macroblocks are detected by the inter prediction unit 306. For example the sum of absolute difference (SAD) between a macroblock and its preceding macroblock in the reference picture may be computed and used to determine if a macroblock is static (i.e. is substantially identical to its preceding macroblock). In other embodiments, the sum of absolute transform difference (SATD) may be used to determine if a macroblock is static with respect to a preceding macroblock. As illustrated, all macroblocks may be processed by both the inter prediction unit 306 and the intra prediction unit 304. Therefore, even if the prediction mode selection unit 302 selects an intra mode, the inter prediction unit 306 may still determine if a macroblock is identical to its preceding macroblock. In addition, in some embodiments, a 16×16 inter prediction with a (0,0) motion vector may be forced when the processed macroblock is substantially identical to its preceding macroblock, even if the other factors used by the prediction mode selection unit 302 (such as cost estimates) would lead it to choose intra prediction. In some embodiments, the forced inter prediction may result in a skip macroblock if other skip specific conditions are met.

When a macroblock has been tagged as static (motionless), its compression quality is progressively improved over multiple pictures if the macroblock remains motionless over the multiple pictures. This serves in distributing the bandwidth used to improve a still picture (or picture area) from low to high quality. It also serves to avoid wasting bandwidth when a macroblock remains still for only a few pictures. Quality is improved in part by decreasing a quantization parameter associated with the macroblock from a start QP to a target QP. In one embodiment, the quantization parameter associated with a macroblock is decreased from a picture to the next picture in order to progressively improve the compression quality of that macroblock. In another embodiment, the quantization parameter associated with a macroblock may increase, decrease or remain unchanged before reaching a target QP, the target QP being lower than the quantization parameter associated with non-static macroblocks of a picture. In this embodiment the overall result of the QP variation will still lead to the improvement of the compression quality of the motionless macroblock over the successively compressed pictures.

The improvement level module 404 is adapted to determine for each macroblock of a picture a corresponding quantization parameter based in part on the result of the processing of the macroblock in the motionless detection module 402 and the quantization parameter associated with its preceding macroblocks. In general, the improvement level module 404 is adapted to modify the QP of successive static regions in accordance with a multi-step change from a start QP to a target QP. This sequence of changes is interrupted when a non-static region is detected, and a regular QP is applied to the non-static region. The multi-step change may cause an increase, decrease, or maintaining of a previous QP for a subsequent QP in accordance with a pre-determined or dynamically determined sequence.

In some embodiments, each macroblock of a picture is associated with an improvement level. The improvement level module 404 may increment a counter representing an improvement level for the macroblock. The improvement level may be a parameter associated with each macroblock as part of the prediction parameters output by the prediction module 202. The improvement level may be stored in memory with the prediction parameters and is used to determine the quantization parameter to apply during the quantization step of the associated macroblock.

In some embodiments, a step-wise progression of improvement levels associated with quantization parameters is used with an improvement level counter that is incremented for each successive motionless macroblock in order to determine the appropriate quantization parameter for compressing a macroblock. This may be implemented with a finite state machine, each state representing an improvement level having a QP associated thereto and the detection of motionless macroblocks acting as the triggering condition for each transition. The state machine may be implemented in hardware using a programmable logic device, a programmable logic controller, logic gates or flips flops. The state machine may also be implemented in software.

Figure 4C:
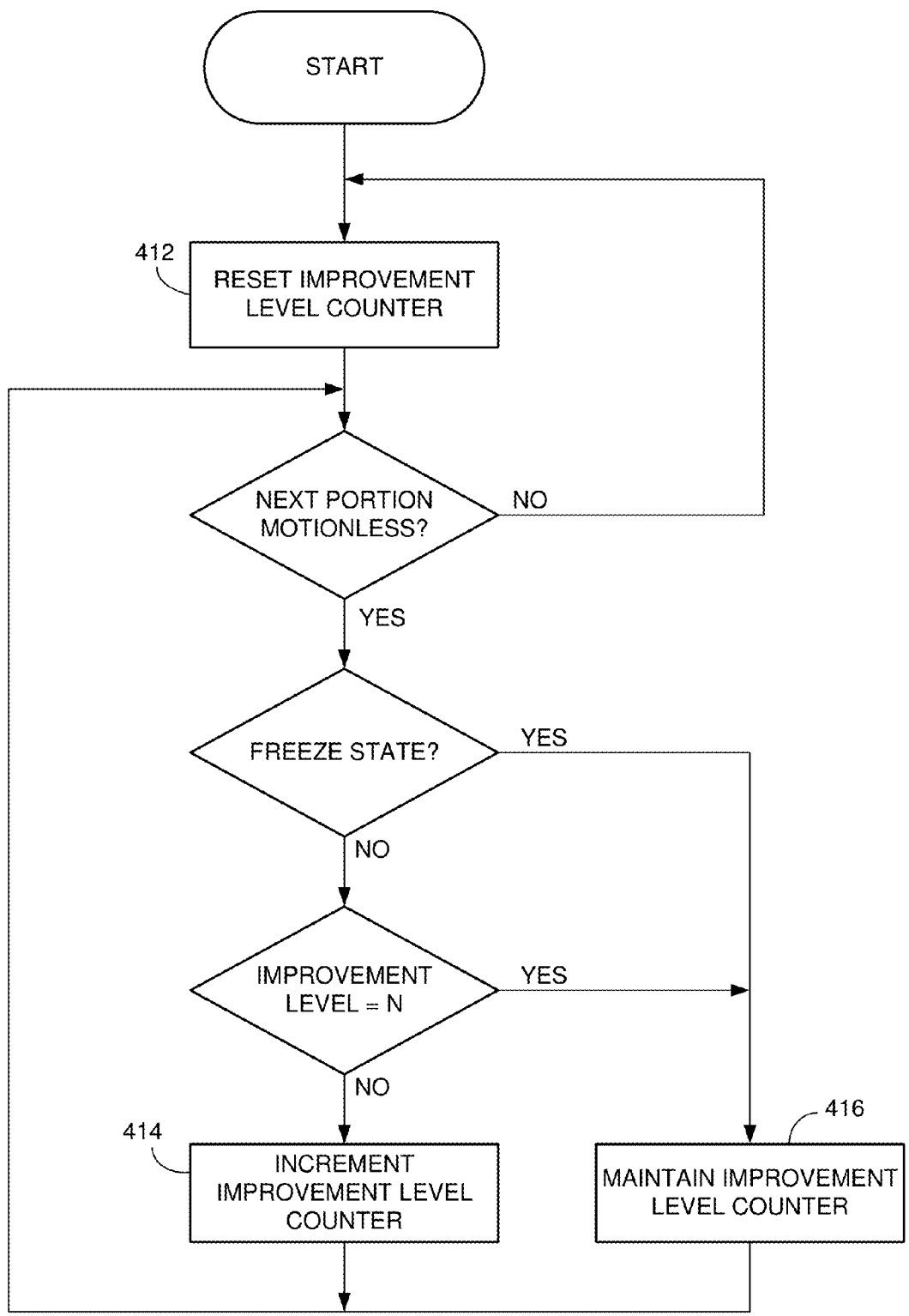
FIG. 4C is a flowchart of an exemplary method for performing motion-adapted quantization during the compression process.

FIG. 4c is an exemplary flowchart for managing an improvement level counter during Motion-based Adaptive Quantization. In this example the counter may be incremented from an initial improvement level '0' to an end improvement level 'N'. In a first step 412, the improvement level counter is reset. As indicated above, the reset level of the counter may be level 0. If a motionless macroblock is detected, a determination is made as to whether the counter should be in a freeze state. For example, this determination is positive in the case of static I-Slice type macroblocks, and the improvement level counter is maintained, as per step 416. In most other cases, the determination is negative and a determination as to the present improvement level of the counter is made. If the counter is already at improvement level N, then its values is unchanged and maintained to N at step 416. If the counter is not at level N, it is incremented at step 414. If a non-static macroblock is detected at any time, the counter is reset to the default improvement level of '0' and will remain as such until a next motionless macroblock is detected by the motionless detection module 402. The progressive increase of improvement levels will begin again for the duration of consecutive motionless macroblocks at the same location. Once the improvement level of a given macroblock has been determined in the improvement level module 404, it may be written to memory 104 by the prediction module 202, and retrieved by the transformation module 204 for determining the appropriate QP to use in the quantization of step 219 of the given macroblock. In some embodiments, a table of improvement levels with associated quantization parameters is stored in the transformation module 204 and may be configured by firmware. The table is used to retrieve the appropriate QP for processing a macroblock in accordance with an associated improvement level.

Each improvement level may be associated with a quantization parameter according to a table of correspondence as will be described in more details below. In one embodiment, the Nth improvement level may be associated with the highest possible value of QP (e.g. 51) or a relative maximum value such as this value is the maximum QP possible for macroblocks of a given picture. The N−1th improvement level may be associated with a target QP for optimized quality. The initial improvement level '0' may be associated with a base QP assigned to all macroblocks with motion. In some embodiments, when a static I-Slice type macroblock is detected and its associated improvement level is determined, the quantization parameter associated with the improvement level may be picked as the lowest QP associated with the preceding improvement levels. For example, the MAQ unit 310 may keep track of the lowest quantization parameter associated with the preceding improvement levels and may output it when a static I-Slice macroblock is processed. In another example, the table of correspondence between QP and improvement levels is updated by software before the processing of the I-Slice macroblock starts in the codec. Table 1 illustrates an exemplary progressive improvement of the quality of a macroblock in subsequent pictures of unchanged content. Each improvement level is associated with a corresponding QP value from start QP to end QP. In some embodiments, each macroblock of a picture is provided, by default, with an improvement level of '0'. Alternatively, in other embodiments, only static macroblocks are associated with an improvement level while non-static macroblocks are not associated with an improvement level and they have their QP set according to a predetermined value, which may or may not correspond to the QP associated with improvement level '0'.

TABLE 1

| Improvement Level | Quantization Parameter |
|---|---|
| 0 | $QP_{start}$ |
| 1 | $QP_{level1}$ |
| 2 | $QP_{level2}$ |
| 3 | $QP_{level3}$ |
| ... | ... |
| N | $QP_{end}$ |

In some embodiments, the improvement level counter is incremented to '1' when a first still macroblock is detected (i.e. the macroblock is substantially identical to the macroblock at the same location in the preceding picture). If the next macroblock is also static, the improvement level counter is incremented to '2'. The improvement level counter continues to be incremented as long as the macroblock remains motionless (from picture to picture) and the last improvement level N hasn't been reached yet. For example, referring to FIG. 4b, macroblock 32 is first associated with an improvement level '0'. If next macroblock 42 is substantially identical to macroblock 32, the improvement level counter is incremented to '1' and its associated improvement level is set to '1'. Further if the next macroblock 52 is still static the improvement level counter is incremented to '2'. Consequently macroblock 32 is compressed in accordance with quantization parameter QPstart, macroblock 42 is compressed with QPlevel1, and macroblock 52 with QPlevel2.

In some embodiments, once the end QP is reached and the macroblock continues to be motionless over successive pictures, the improvement level counter remains at N and the QP stays as the end QP. In one embodiment, the end QP is set to a target QP. The target QP may be a low quantization parameter providing the best quality compression for the compressed data stream. In another embodiment, the end QP may be set to a high value (QPOFF) until a next macroblock with motion is detected or until the improvement level counter is reset or decreased. For example, QPOFF may be a maximum QP value, such as '51'. Other values for QPOFF may also be used. Setting the QP associated with the last improvement level to a high value ensures that the consumption of bits is minimized once the compression of still macroblocks at the same position has reached a target quality.

In one embodiment, the number of improvement levels is determined as a function of the number of steps between the start QP and the end QP as well as the size of each step. Steps may be of constant size or varying size and will impact the speed of transition for the improved quality. For example, if the start QP is 40, the end QP is 20, and the step size is constant and set to 2, there will be 11 levels of improvement (0 to 10) until the end QP is reached. If the start QP is 38, the end QP is 14, and it is desired to have 16 improvement levels, the following sequence of QPs may be used: 38, 36, 35, 31, 30, 29, 28, 26, 25, 24, 22, 20, 19, 17, 15, 14. These values for start QP, end QP, N, and step size are exemplary and provided for illustrative purposes.

In another embodiment, the improvement levels may be associated with varying values of QP. In one example, the quantization parameters associated with the improvement levels may be determined such that the first QPstart is a base QP applied to all types of macroblocks (static or non-static). The last improvement level is associated with a high QP value (QPend) and the next to last improvement level is associated with a target QP which optimizes the encoding quality of static macroblocks. The other quantization parameters associated with intermediate improvement levels may alternate between non-decreasing and decreasing values converging towards the target QP.

Table 2 represents an example of quantization parameters that can be associated with each improvement level for a given picture. According to this example and referring back to FIG. 4b, macroblock 32 is first compressed using quantization parameter '40'. In the next picture 40, motionless macroblock 42 is compressed according to quantization parameter '51'. In the next picture 50, motionless macroblock 52 is processed according to quantization parameter '51'. The same motionless macroblock in a following picture will be processed according to quantization parameter '38', etc. In this example, the decrease of the quantization parameter towards the target QP 25 is provided at a rate that allows a controlled consumption of bits necessary for improving the compression of the macroblock over time and avoiding unnecessary quality improvement when static content does not last. For example if a first static macroblock is detected, its improvement level is incremented to 1 and it is encoded according to quantization parameter 51. Since its preceding macroblock was encoded according to QPstart=40 which is lower than 51 and the first static macroblock is compressed according to a 16×16 inter prediction with the preceding macroblock as reference, the compression quality of the macroblock is not degraded in comparison with the compression quality of its preceding macroblock. Further the consumption of bandwidth for compressing the macroblock is controlled. If the next macroblock is not static, its improvement level is reset to 0 and it is compressed according to the base QP 40. On the contrary, if the successive macroblocks remain static for a plurality of pictures such that the improvement level counter is successively incremented from a picture to the next, the compression quality of the successive static macroblocks is increasingly improved when it reaches for example level 3, level 5 and/or level N−1 and remaining at the same quality level as preceding macroblocks when it reaches level 1, level 2 and level 4 etc.

TABLE 2

| Improvement Level | Quantization Parameter |
| --- | --- |
| 0 | 40 |
| 1 | 51 |
| 2 | 51 |
| 3 | 38 |
| 4 | 51 |
| 5 | 32 |
| ... | ... |
| N − 1 | 25 |
| N | 51 |

In some embodiments, when an improvement level is associated with the highest possible value for QP (e.g. 51), the processing of the static macroblock in the prediction module 202 may result in skipping the compression of the macroblock if the prediction of the macroblock's motion vector is (0,0). This may be implemented by setting a skip_macroblock parameter to 1 for configuring the transformation module 204 and entropy module 208. In some embodiments, an improvement level may be directly associated with a skip_macroblock parameter instead of being associated with a QP value. In these embodiments, a macroblock is skipped whenever it reaches one of these levels. For example, level N may be associated with a skip_macroblock parameter. In some embodiments when an improvement level is associated with a QP=0, the codec may entropy encode the macroblock. This may be implemented by setting a transform_bypass parameter to 1 for bypassing the quantization and transformation steps and processing the macroblock directly in the entropy module 208. In some embodiments, an improvement level may be directly associated with a transform_bypass parameter instead of being associated with a QP value. In these embodiments, a macroblock is losslessly compressed whenever it reaches one of these levels.

In some embodiments, the quantization parameters associated with each improvement level and the number of improvement levels associated with each macroblock of a picture may be programmable in firmware and may be changed in between pictures. Even if the steps of the process illustrated in FIG. 4c are described for each macroblock, motion-based adaptive quantization may be performed on a region by region basis wherein a region comprises a plurality of macroblocks. For example, in these embodiments, the determination of a static region may be performed by comparing all macroblocks of the region with all macroblocks of the region in a preceding picture and determining if they are substantially identical. The quantization parameter determined according to MAQ is then used to compress all the macroblocks of the region in the transformation module 204.

In some embodiments, a statistics generation module 406 may be provided in the MAQ unit 310 to maintain statistics of the improvement levels. The improvement levels associated to a plurality of static macroblocks in a picture may thus be adapted as a function of the statistics. A counter may determine the number of regions at a given level for each picture, for each portion or for each slice of a picture. These statistics may be used to change the improvement levels associated with each macroblock of a picture being processed. For example, the codec 102 may determine that only a subset of the static macroblocks may increment their associated improvement level while the rest of the static macroblocks may either remain at their current improvement level or decrement to any one of the preceding improvement levels. The improvement levels may be updated for each macroblock before its processing in the transformation module 204. For example, the improvement level associated with a macroblock is updated in memory by the control module 200 before the macroblock is processed in the transformation module 204. The quantization parameter used to process a macroblock corresponds to the quantization parameter associated with the updated improvement level. This provides a form of control of the number of macroblocks trying to increment their improvement levels, thus also controlling the total number of bits that are required for improving the quality of all still macroblocks of a portion of a picture. In some embodiments the statistics may be used to determine an updated step-wise progression of improvement levels with updated associated quantization parameters.

Figure 5:
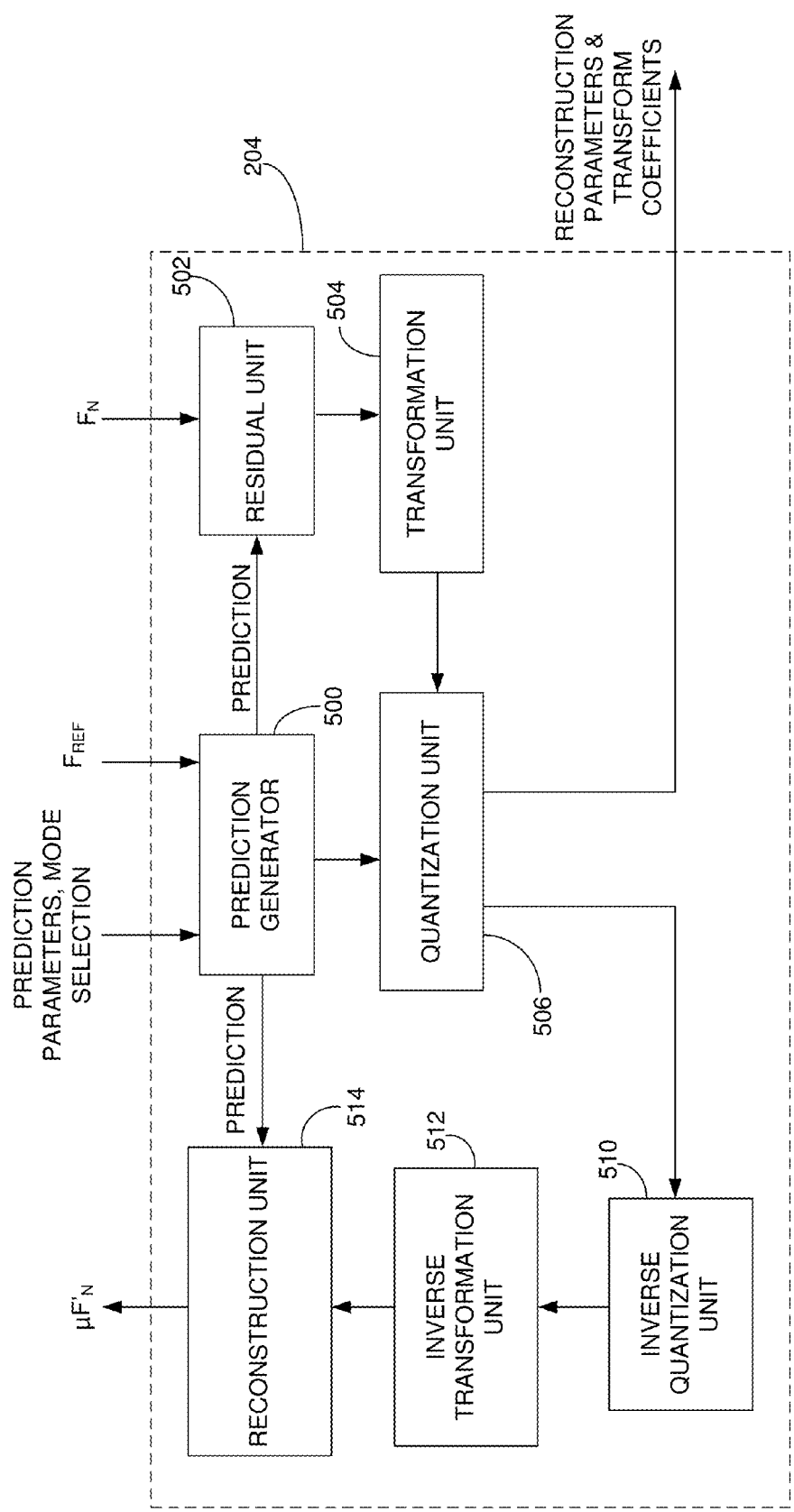
FIG. 5 is a block diagram of an exemplary transformation module of the codec of FIG. 2A.

FIG. 5 illustrates an exemplary embodiment of the transformation module 204 for data compression. The prediction parameters, mode selection and reference pictures FREF are read from memory 104 by the transformation module 204 and used by a prediction generator 500 to generate the prediction. The generated prediction is provided to a residual unit 502 and subtracted from the image data FN in order to generate the residual. The residual is transformed via a transformation unit 504 and quantized via a quantization unit 506 to obtain a set of quantized transform coefficients. The improvement level comprised in the prediction parameters is used to determine an associated quantization parameter. In one example, this determination is performed in accordance with a table of correspondence comprised in the quantization unit 506. In some embodiments, the quantization parameter updated as per MAQ may be used alone or in combination with other adaptive quantization schemes to determine the final quantization parameter for quantizing the transform coefficients of the residual. For example, MAQ may be used in addition to Variance-based adaptive quantization and/or to ROI quantization to determine a final quantization parameter with which to quantize a macroblock.

The transformation applied by the transformation unit 504 depends on the standard followed for the compression. For example, under H.264, various transforms are used depending on the type of residual data that is to be coded: a 4×4 or 8×8 DCT-based transform (Discrete Cosine Transform) is performed on luma and chroma coefficients and a Hadamard transform may be performed on DC coefficients in intra macroblocks predicted in 16×16 mode. Under other standards, other transforms may be used, as appropriate. The quantization unit 506 may be a scalar quantizer, as per H.264.

As well as encoding and transmitting the image data, the transformation module 204 may decode, or reconstruct, the encoded image data in order to provide a reference for further predictions. The quantized transform coefficients generated by the quantization unit 506 are scaled ($Q^{-1}$) via an inverse quantization unit 510 and inverse transformed ($T^{-1}$) via an inverse transformation unit 512 to produce a difference block $D_N'$. The prediction generated by the prediction generator 500 is added to the difference block $D_N'$ by a reconstruction unit 514 to create a reconstructed block $\mu F'_N$. The reconstructed block is a decoded and unfiltered version of the original block. The reconstruction block may be written to memory 104 for future use or passed directly to a filtering module such as the in-loop filter module 206. Alternatively, the in-loop filter module 206 may read the reconstruction block from memory 104. In some embodiments, filtering is performed to reduce the effects of blocking distortion and the reconstructed reference picture is created from a series of blocks $F'_N$. In some embodiments, the in-loop filter module 206 is not used in the compression of image data and may not be included in the codec 102.

Figure 6:
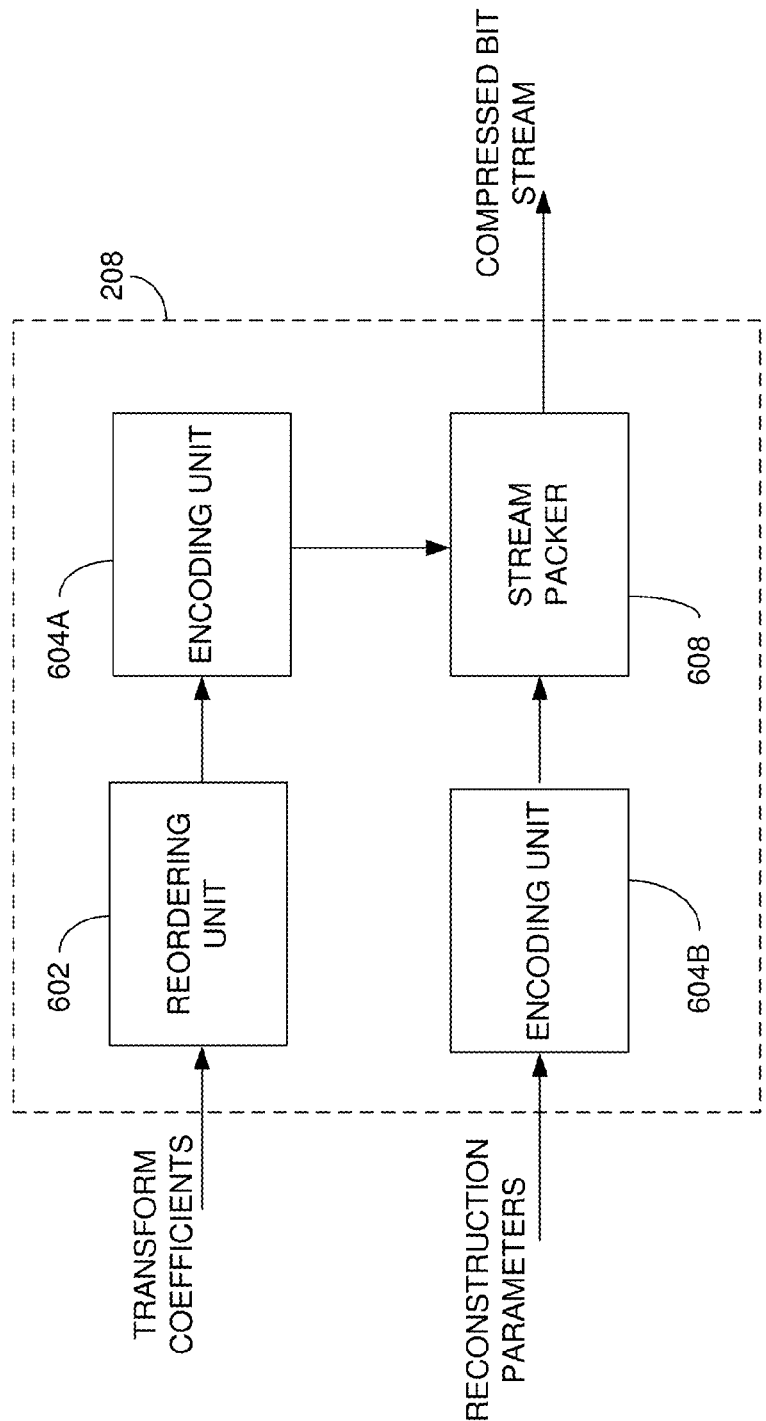
FIG. 6 is a block diagram of an exemplary entropy module of the codec of FIG. 2A.

In accordance with some embodiments, the reconstruction parameters and transform coefficients as output by the quantization unit 506 are written to memory 104 for retrieval by the entropy module 208 for entropy coding. Alternatively, the reconstruction parameters and transform coefficients may be provided directly to the entropy module 208. In some embodiments, the reconstruction parameters and transform coefficients are partially lossless encoded in the transformation module 204 and the lossless encoding is completed in the entropy module 208 before the encoded data is output from the codec 102. FIG. 6 is an exemplary embodiment of an entropy module 208. A reordering unit 602 receives the transform coefficients and scans them in a given zig-zag order. Encoding unit 604a performs entropy coding on the reordered transform coefficients using any known entropy coding mappings. For example, this may be done by mapping a 2×2, 4×4, or 8×8 block of quantized transform coefficients to a 4, 16, or 64-element array, respectively. Elements may be encoded using either variable-length codes such as Context-adaptive Variable Length codes (CAVLC) and Exp-Golomb codes, or using Context-adaptive Arithmetic Coding (CABAC), depending on the entropy encoding mode, as per H.264. Other entropy coding compression schemes may also be applicable. Similarly, encoding unit 604b performs entropy coding on the reconstruction parameters using any known entropy coding mappings. Table 3 illustrates examples of parameters to be encoded by encoding unit 604b.

TABLE 3

| Parameters | Description |
| --- | --- |
| Sequence-, picture-and slice-layer syntax elements | Headers and parameters |
| Macroblock type | Prediction method for each coded macroblock |
| Coded block pattern | Indicates which blocks within a macroblock contain coded coefficients |
| Quantizer parameter | Transmitted as a delta value from the previous value of QP |
| Reference frame | |
| Reference frame index | Identify reference frame(s) for inter prediction |
| Motion vector | Transmitted as a difference (mvd) from predicted motion vector |

A stream packer 608 generates a compressed bit stream, which may be written to memory 104 or transmitted to another module, internal or external to system 100.

The codec 102 as described above and shown in FIG. 2a may also comprise additional components (not shown), such as a filtering module, a display module, an output module, and an input module. For example, the filtering module may be used to filter a picture or a stream of image data before being processed by the prediction module 202. The filtering module may also be used to remove noise from a picture before the different compression steps are performed on the picture. The display module may be used to output an uncompressed video stream stored in the memory 104 to a display monitor at a given display rate. The output module may be used to output compressed or uncompressed image data to processing modules external to the codec 102. The input module may be used to receive uncompressed image data from an external source such as a video camera. The input module may also receive compressed image data. The different modules of the codec 102 are connected to the memory 104 through the memory interface 210.

The architecture of the codec as illustrated in FIG. 2a allows certain steps of the compression process to occur in parallel and allows the performance (or efficiency) of some modules to be decoupled from the performance of other modules. For example, the entropy module 208 may read data from the memory 104 independently of the processing performed by the transformation module 204. In some embodiments, the architecture of the codec as illustrated in FIG. 2a may be configured to compress image data and/or to decompress encoded bit streams.

According to some embodiments, the different modules present in codec 102 may be duplicated in order to speed up the processing of data and provide better performances to the codec 102 when implemented in a chip. For example, the codec 102 may comprise many instances of the entropy module 208, and/or many instances of the transformation module 204 and the prediction module 202. According to other embodiments, the entropy module 208 of the codec 102 may comprise a plurality of sub-modules, each module performing a compression or decompression type. For example, the entropy module 208 may comprise a CABAC encode module and a CABAC decode module, a CAVLC encode module and a CAVLC decode module. In another example, the entropy module 208 includes a plurality of instances of the CABAC decode module, a CAVLC encode module, a CAVLC decode module along with a CABAC encode module. In general the entropy module 208 may comprise a plurality of the same sub-module and other sub-modules.

In some embodiments, the codec 102 may be configured to process a plurality of independent streams simultaneously. For example, the prediction module 202 may be configured to process a first group of macroblocks of a first stream while the transformation module 204 is configured to process a first group of macroblocks of a second stream. At any given time, the processing occurring in a module is independent from the processing of the other modules. Consequently the task and the data processed in the different modules are independent. For example, a prediction module 202 can be configured to perform the compression steps of a first group of macroblocks while the entropy module 208 is performing decompression tasks of a second stream.

In some of the embodiments described above, the modules included in the codec 102 are described as register-based engines. The register-based engines may be double or multi-buffered. In other embodiments, one or more of the modules may be implemented as command-based engines receiving commands and data and performing the tasks as described above.

Controlled Motion-Based Adaptive Quantization:

Motion-based Adaptive Quantization improves the compression quality of static regions of a picture. When the MAQ mode is enabled, the codec 102 configures the prediction module 202, the transformation module 204 and the entropy module 208 with appropriate parameters to compress image data in accordance with motion-based adaptive quantization. In this mode, static (or motionless) macroblocks of image data are detected in each picture and the compression quality of the motionless macroblocks is improved in successive pictures. The quality improvement is performed in part by modifying the quantization parameter of each detected motionless region (e.g., a macroblock or a group of macroblocks) and setting it to an appropriate value that increases the compression quality of the region with respect to the same regions in preceding pictures. The quality improvement is interrupted when a non-static region is detected. When a new motionless region is detected, the quality improvement scheme restarts and the quantization parameter varies again. The quantization parameter of each macroblock is adapted in order to obtain a customized and ideal compression quality for that macroblock. This mechanism allows for the compression bandwidth usage to remain stable and constant, by spreading the improvement of the compression quality over multiple pictures (in particular by applying a QP that varies from a start QP to a target QP, where the target QP provides a higher compression quality than the start QP).

In some embodiments, the distribution of the compression bandwidth can be done by also limiting the number of motionless regions being improved per picture. In these embodiments, when motionless regions (i.e., static regions) are detected in a picture, a decision is made to limit the number of regions of which the compression quality is to be increased. As will be described in further details below, when a set of static regions is detected in a picture, a subset of these static regions is selected to be compressed according to a higher quality (i.e., with a lower QP than the one used for these regions in preceding pictures) while the compression quality of another subset of these static portions is not improved. This enables a higher control over the compression bandwidth consumed for a given picture.

A method and apparatus for compressing a data stream comprising a plurality of pictures are described. A first quantization parameter (QP) from a plurality of QPs is determined for a static region in a current picture from the plurality of pictures. The plurality of QPs change in accordance with a multi-step change from a start QP to a target QP and each one of the plurality of QPs is to be applied to a respective one from successive static regions in successive pictures. The location of each one of the successive static regions within its respective successive picture is the same as a location of the static region within the current picture. Based upon statistics on one or more static regions in the current picture which are associated with the first QP, a determination of whether to select the first QP is performed. In response to determining that the first QP is selected, the static region is compressed based upon the first QP, and in response to determining that the first QP is not selected, the static region is compressed based upon a second QP that is greater than the first QP. In some embodiments, this causes the compression quality of the static region to remain at the same level as the region preceding the static region.

Figure 7:
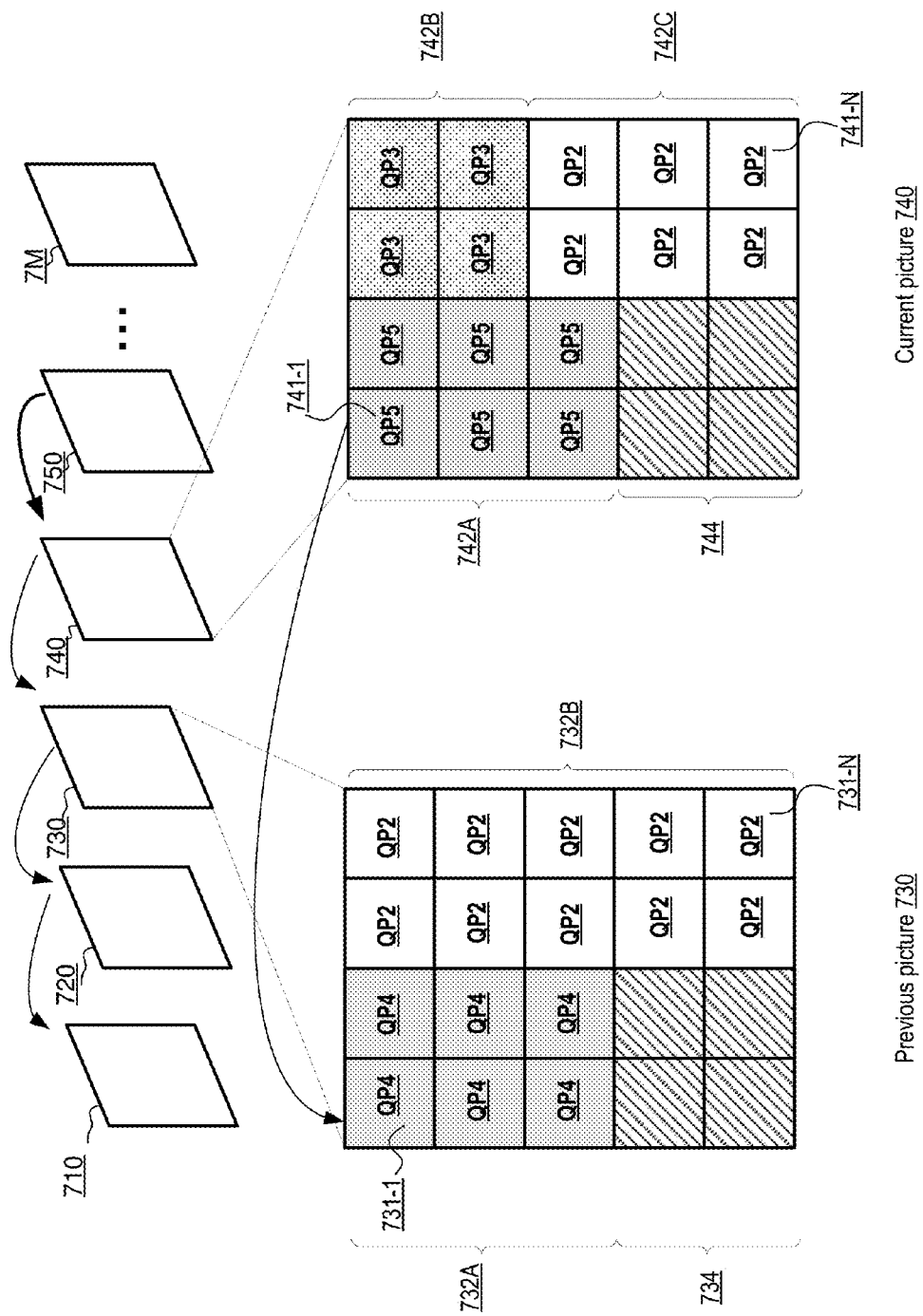
FIG. 7 illustrates exemplary successive pictures of a data stream to be compressed in codec 102 according to a given compression order, in accordance with some embodiments.

FIG. 7 illustrates exemplary successive pictures of a data stream to be compressed in codec 102 according to a given compression order, in accordance with some embodiments. Pictures 710-7M are successively compressed in the codec 102 starting with picture 710 followed with 720, 730, 740 . . . until 7M. Pictures 730 and 740 are illustrated in further details. In the illustrated picture, the number of regions N=20 is intended to be exemplary only and not limiting. Each picture may include any number N of regions. A region of a picture may refer to a sub-set of a picture comprising a macroblock or a group of macroblocks. Each of picture 730 and picture 740 includes static and non-static regions. In a non-limiting example, the non-static regions can be related to video content or video game content displayed in an application of a desktop display, while the static regions includes graphical content of the desktop display that remains motionless over a number of successive pictures. Other examples of pictures including static and non-static content can be contemplated without departing from the scope of the present invention.

Picture 730 includes a set of regions 731 (from region 731-1 to region 731-N). The set of regions 731 includes a first subset 734 of non-static regions and subsets of static regions 732A-B. Each region of the first subset 732A is compressed in the codec 102 based upon the same quantization parameter QP4, while each region of the second subset 732B is compressed in the codec 102 based upon another quantization parameter QP2. For example, in a non-limiting example, and with reference to Table 2, QP4 may have a value of 51 and QP2 a value of 51. In other examples, QP4 and QP2 may have different values from the set of QPs ranging from the start QP to the target QP.

Picture 740 comprises the regions 741 (from region 741-1 to region 741-N) including non-static regions (e.g., the subset of regions 744) and static regions (subsets 742A-C). Each region from picture 730 has a corresponding region from picture 740 that is located at the same location within its respective picture. For example, region 731-1 in picture 730 is located at the same position as 741-1 in picture 740 and region 731-N in picture 730 is located at the same position as 741-N in picture 740. Given that picture 730 is compressed prior to picture 740 it may be referred to as a "previous picture" relative to picture 740. Regions 731-1 and 741-1 are an example of successive regions located at the same location in successive pictures. Each one of region 731-1 and region 741-1 comprises at least one macroblock. In this example, the subsets 742A-C includes regions that remain static from picture 730 to picture 740 such that a region within subsets 742A-C is substantially identical to a corresponding region located at the same location within subsets 732A-B.

The compression quality of the static regions is improved from picture 730 to picture 740. In some embodiments, in order to control the compression bandwidth usage, the number of static regions to be improved can be limited and not all static regions of a picture are improved. The determination of whether a region is to be compressed according to a quantization parameter that improves its quality or not is performed based on statistics maintained for each quantization parameter for the picture including the region. In the illustrated example of FIG. 7, a limit on the number of regions to improve is enforced in order to control the compression bandwidth usage. For example, in some embodiments, for each quantization parameter to be used in a picture (e.g., QP3 and QP5 in picture 740) a limit on the number of regions that may be compressed according to this quantization parameter can be set. In some embodiments, instead of limiting the number of regions for each quantization parameter individually, a limit could instead be defined for a group of quantization parameters. In some embodiments, a limit per quantization parameter and per group of quantization parameters can be used in conjunction, with either one of the limits able to restrict the number of regions to be improved.

These limits can change per picture depending on factors like picture QP, current bandwidth usage, scene complexity, etc. In the illustrated example, regions 742A and 742B are compressed according to an improved quality when compared to their corresponding regions in picture 730 (regions 742A are compressed according to QP5 and regions 742B are compressed according to QP3), while regions 742C remain at the same compression quality when compared to their corresponding regions in picture 730 (i.e., compressed according to QP2).

In some embodiments, a statistics generation module 406 may be provided in the MAQ unit 310 of the prediction module 202 to maintain statistics of the quantization parameters used in a picture. The quantization parameters associated to a plurality of static regions in a picture may thus be adapted as a function of these statistics. A counter may determine the number of regions compressed according to a given quantization parameter for each picture, or for each slice of a picture. In the embodiments where the limits are defined for a group of quantization parameters, values of the counters of each QP from the group are added together to form the statistics for the group of QPs. These statistics may be used to change the quantization parameter associated with each region of a picture.

FIG. 8A illustrates an exemplary table including quantization parameters and associated limits for number of regions that can be improved to each quantization parameter in accordance with some embodiments. For each quantization parameter QP_i (which, in the illustrated example, ranges from QP_start to QP_N (where QP_N corresponds to QPend and is preceded with the target QP (QP_N−1))), a corresponding max_i is assigned. In this example, QP_start doesn't have a limit since it represents the quantization parameter associated with non-static regions. In one example, max_i indicates a maximum number of regions that can be improved in a picture to the given quantization parameter QP_i. In another example, max_i indicates a number of regions that can be improved, in a portion of a picture or in a slice, to the given quantization parameter QP_i. The values of these statistics can be set for a given data stream, or per picture and they can be updated dynamically from a picture to a next picture.

In some embodiments, instead of limiting the number of regions for each quantization parameter individually, a limit could instead be defined for a group of quantization parameters. In some embodiments, a limit per quantization parameter and per group of quantization parameters can be used in conjunction, with either one of the limits able to restrict the number of regions to be improved. For example, with reference to FIG. 8A, QP1 (38) and QP2 (32) can be included in the same cell of the table and associated with a single Max_1. In this example, Max_1 indicates that the sum of the number of regions to be improved to QP1 or QP2, in a picture, is not to exceed Max_1.

In some embodiments, each region of a picture is associated with an improvement level. For example, the improvement level module 404 of the MAQ unit 310 may increment a counter representing an improvement level for the region. The improvement level may be a parameter associated with each region as part of the prediction parameters output by the prediction module 202. The improvement level may be stored in memory with the prediction parameters and is used to determine the quantization parameter to apply during the quantization step of the associated macroblock.

In these embodiments, a step-wise progression of improvement levels associated with quantization parameters is used with an improvement level counter that is incremented for each successive motionless region in order to determine the appropriate quantization parameter for compressing a region. This may be implemented with a finite state machine, each state representing an improvement level having a QP associated thereto and the detection of motionless regions acting as the triggering condition for each transition. The state machine may be implemented in hardware using a programmable logic device, a programmable logic controller, logic gates or flips flops. The state machine may also be implemented in software. In these embodiments, when the codec 102 determines that the quality compression of a region is to be improved, the improvement level of the region is incremented to the next level. Alternatively, when the codec 102 determines that the quality compression of a static region is not to be improved, the improvement level of the region is not incremented and remains at the same level as the preceding region. In some alternative embodiments, when the codec 102 determines that the quality compression of a region is not to be improved, it may assign a high quantization parameter (e.g., 51) to the region that is independent of the improvement level assigned for the region.

In these embodiments, statistics about improvement levels can be maintained in the MAQ unit 310 instead of maintaining statistics about the quantization parameters. However, given that each improvement level is associated with a given quantization parameter, the statistics are indirectly representative of the quantization parameters as well. FIG. 8B illustrates an exemplary table including improvement levels and associated limits for number of regions that can be improved to each level, in accordance with some embodiments. For each improvement level i (which ranges from 0 to N in the illustrated example), a corresponding max_i is assigned. In this example, improvement level 0 doesn't have a limit since it represents the non-static regions. In one example, max_i indicates a maximum number of regions that can be improved in a picture for the given level. In another example, max_i indicates a number of regions that can be improved, in a portion of a picture or a slice, for each level. The values of these statistics can be set for a given data stream, or per picture and they can be updated dynamically from a picture to a next picture.

In some embodiments, instead of limiting the number of regions for each level individually, a limit could instead be defined for a group of levels. In some embodiments, a limit per level and per group of levels can be used in conjunction, with either one of the limits able to restrict the number of regions to be improved. For example, with reference to FIG. 8B, improvement level 1 and improvement level 2 can be included in the same cell of the table and associated with a single Max_1. In this example, Max_1 indicates that the sum of the number of regions to be improved to quantization parameters associated with improvement level 1 and improvement level 2, in a picture, is not to exceed Max_1.

Assigning limits on the number of static regions of which the compression is to be improved from a picture to the next picture, enables a greater control over the number of these regions, thus also controlling the total number of bits that are required for improving the quality of all static regions of a picture. Various methods can be used to enforce the limits assigned to quantization parameters or improvement levels in a picture. While the embodiments below will be described with respect to the quantization parameters, the same mechanism applies when MAQ is performed with the improvement levels. Further, while the embodiments below will be described with reference to limits set for each quantization parameter, alternatively the same mechanism apply when the limits are defined for a group of quantization parameters/levels.

In a first embodiment, the limits may be enforced after the quantization parameters have been determined for each region of the picture. For example with reference to picture 740 of FIG. 7, when motion-based adaptive quantization is performed on the picture, all static regions of the picture (i.e., subsets 742A-C) are improved to the next quantization parameter. Subset 742A is improved to QP5=32 and subsets 742B and 742C are improved to QP3=38. In one embodiment, the MAQ unit 310 may store in memory the quantization parameters of the picture 740 prior to processing the picture in the transformation module 204. The quantization parameters are then updated in memory based on the statistics of the pictures and the limits on the number of regions to be improved that are set for each quantization parameter.

For example, with reference to FIG. 2A and the codec 102, after the processing of a picture (e.g., picture 740) in the MAQ module 310 has been completed, but before the transformation module 204 starts processing the regions, a check is done to the MAQ statistics. The quantization parameters are then updated with the control module 200 based on the MAQ statistics and the limits. The MAQ statistics indicate for each quantization parameter the numbers of regions in a picture that are to be improved according to that QP. These statistics are compared with the limits (max_i) assigned to each QP and the QPs of the picture are updated accordingly. In the illustrated example, the number of regions that can be improved to QP3 in a picture is reached (such that the number of regions in picture 740 at QP3 is higher than the max_3) and consequently the regions of subset 742C are rolled back to QP2 before those regions are processed in the transformation module 204.

In other embodiments, the improvement levels associated with regions of a picture are stored in memory and updated by the control module 200 before the region is processed in the transformation module 204. Similarly to the description above, the improvement levels are incremented to the next improvement level. For example if regions 732A are associated with an improvement level 4, the corresponding regions in picture 740 are incremented to improvement level 5. If regions 732B are associated with improvement level 2, the corresponding regions in picture 740 are incremented to improvement level 3. However, based on the number of regions to increase and the corresponding limits set for this level, the improvement levels associated with a subset of these regions (742C) is not incremented and remains at an improvement level of 2. In these embodiments, the quantization parameter used to process a region corresponds to the quantization parameter associated with the updated improvement level.

In some embodiments, instead of storing an improved quantization parameter (or improvement level) for the static regions of picture 740, the codec 102 stores the QPs (or improvement levels) of the preceding picture (e.g., in the illustrated example the QPs of picture 730 which are QP4 and QP2) and indicate that these regions remained static such that the quality improvement is performed at the time the regions are processed in the transformation module 204. In these embodiments, when it is determined that the compression of a static region is not to be improved, this static region is processed according to the stored QP (which is QP2 in the example) instead of being compressed according to a QP that would have provided a higher compression quality (e.g., QP3). In other embodiments, a high value of QP can be assigned to each static region that cannot be improved due on the limits set for a picture.

Figure 9A:
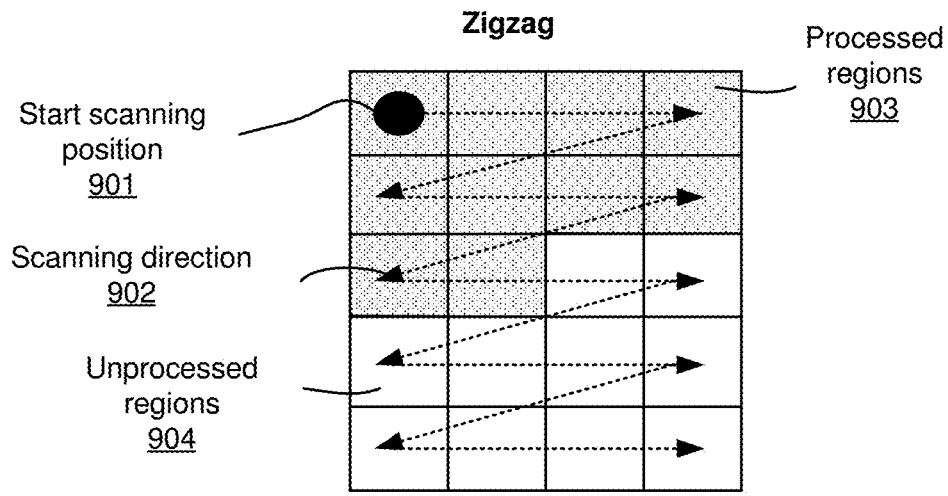
FIG. 9A illustrates an exemplary non-limiting scanning patterns for processing regions of a picture, in accordance with some embodiment.
Figure 9B:
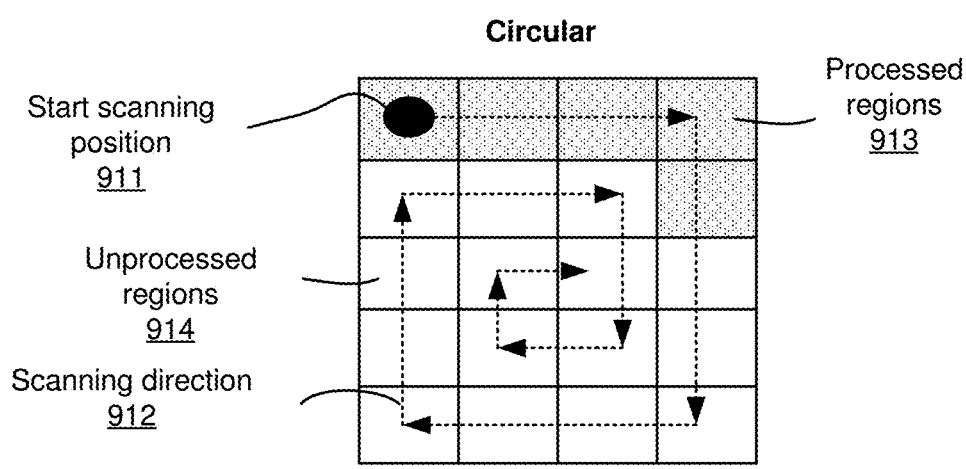
FIG. 9B illustrates an exemplary non-limiting scanning patterns for processing regions of a picture, in accordance with some embodiment.

In these embodiments, the selection of the static regions for which compression quality is not to be improved may be determined based on a scanning pattern of the picture. FIGS. 9A and 9B illustrate two exemplary non-limiting scanning patterns for processing the regions of a picture, in accordance with some embodiment. These scanning patterns can be used to select the next region to process within the transformation module 204 after the picture has been processed in the MAQ unit 310. In these embodiments, the picture is scanned according to a scanning direction (902, 912) from a start scanning position (901 or 911) until the end of the picture. Scanning pattern of FIG. 9A can be used for determining the static regions that are to be improved vs. the static regions that are not improved. For example, this scanning pattern results in the selection of subset 742B as regions to be improved and subset 742C that remains at a previous compression quality. These scanning patterns are presented as exemplary patterns that can be used, other patterns can be used within the scope of the present invention.

In a second embodiment, the limits may be enforced while motion-based adaptive quantization is performed for each region of the picture (e.g., when the picture is being processed in the MAQ unit 310). In this embodiment, during the processing of a picture in the MAQ unit 310, the statistics of the number of improved regions is continually compared with the limits assigned for a QP/improvement level (or for a group of QPs/Improvement levels). If a limit of improved regions is reached, improvement of all remaining unprocessed regions of the picture at that level/group of levels are blocked (i.e., all macroblocks remain at their current QP (improvement level) or set to a higher QP).

The operations in the flow diagrams will be described with reference to the exemplary embodiments of FIGS. 1-9B. However, it should be understood that the operations of the flow diagrams can be performed by embodiments of the invention other than those discussed with reference to these FIGS. 1-9B, and the embodiments of the invention discussed with reference to FIGS. 1-9B can perform operations different than those discussed with reference to the flow diagrams.

Figure 10:
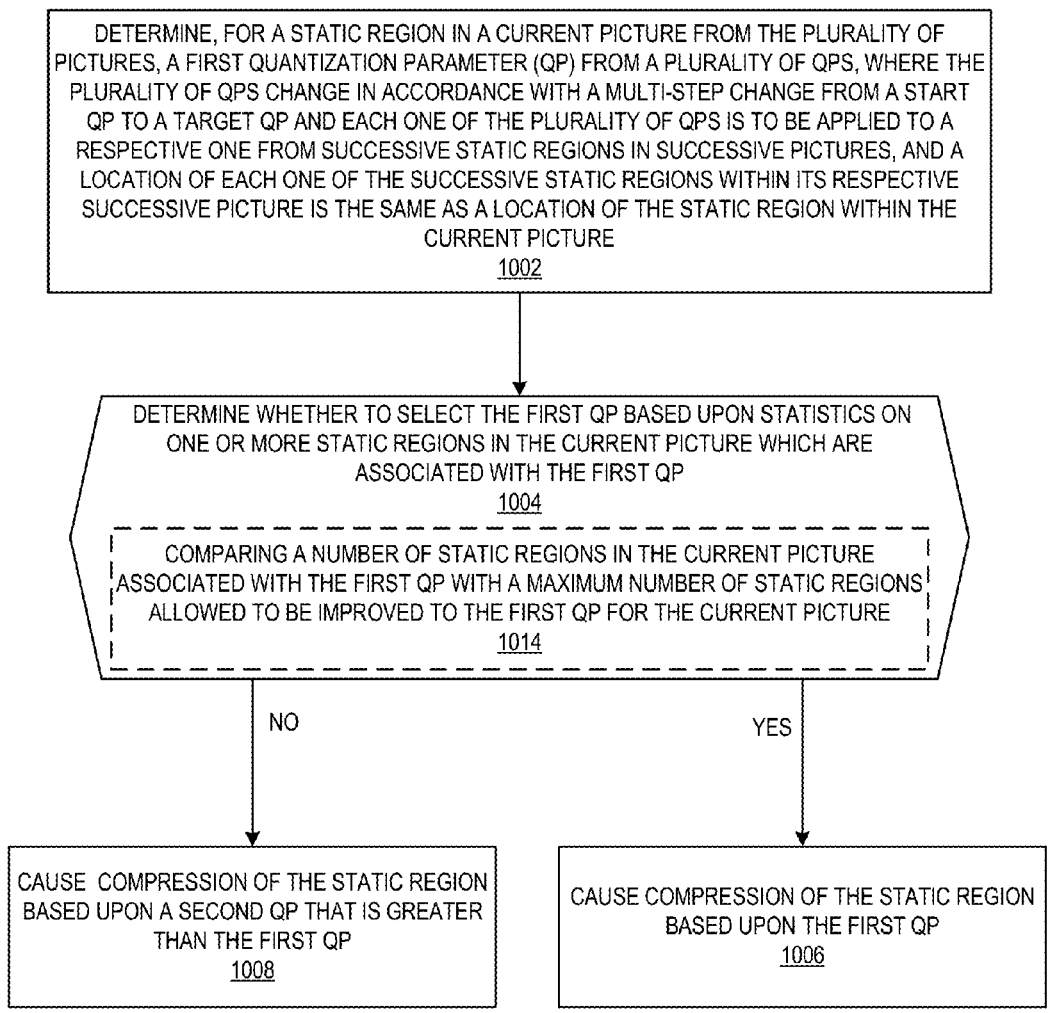
FIG. 10 illustrates a flow diagram of exemplary operations for compressing a data stream comprising a plurality of pictures, in accordance with some embodiments.

FIG. 10 illustrates a flow diagram of exemplary operations for compressing a data stream comprising a plurality of pictures, in accordance with some embodiments. At operation 1002, a first quantization parameter (QP) from a plurality of QPs, is determined for a static region in a current picture from the plurality of pictures. For example, the MAQ unit 310 determines a first quantization parameter QP3 to be used for compressing a static region from picture 740. The plurality of QPs change in accordance with a multi-step change from a start QP to a target QP and each one of the plurality of QPs is to be applied to a respective one from successive static regions in successive pictures. A location of each one of the successive static regions within its respective successive picture is the same as a location of the static region within the current picture.

Flow then moves to operation 1004, at which the codec 102 determines whether to select the first QP based upon statistics on one or more static regions in the current picture which are associated with the first QP. For example, the statistics generation module 406 provided in the MAQ unit 310 maintains statistics of the improvement levels or quantization parameters. A counter, of the statistics generation module 406, may determine the number of regions at a given level or QP for each picture, for each portion or for each slice of a picture. In some embodiments, flow can move to operation 1014, at which a number of static regions in the current picture associated with the first QP is compared with a maximum number of static regions allowed to be improved to the first QP for the current picture. In some embodiments, determining that the first QP is selected includes determining that the number of static regions in the current picture associated with the first quantization parameter is smaller than the maximum number allowed to be compressed at the first QP for the current picture. Further, determining that the first QP is not selected includes determining that the number of static regions in the current picture associated with the first quantization parameter is greater or equal to the maximum number allowed to be compressed at the first QP for the current picture. In another embodiment, determining that the first QP is selected includes determining that the number of static regions in the current picture associated with the first quantization parameter and with one or more other quantization parameters is smaller than the maximum number allowed to be compressed at the quantization parameters from this group of QPs for the current picture. Further, determining that the first QP is not selected includes determining that the number of static regions in the current picture associated with the first quantization parameter and with one or more other quantization parameters is greater than the maximum number allowed to be compressed at the quantization parameters from this group of QPs for the current picture.

Flow then moves to operation 1006, at which in response to determining that the first QP is selected, the static region is compressed based upon the first QP. The selection of the first QP causes the static region to be compressed according to an increased compression quality when compared to the compression quality of a previous region (in a previous picture). For example, with reference to FIG. 7, static regions of subset 742A are compressed based on QP5=32 which results in a higher compression quality when compared with compression of its corresponding region in the previous picture 730 (that is compressed according to QP4=51).

Alternatively, flow moves to operation 1008, at which in response to determining that the first QP is not selected, compression of the static region is performed based upon a second QP that is greater than the first QP. The compression of the static region based on the second QP does not increase the compression quality of the region and consequently provides a mechanism for controlling the number of regions trying to increment their compression quality from a picture to the next picture, thus also controlling the total number of bits that are required for improving the quality of all static regions of a picture.

In some embodiments, the second QP was selected to compress a previous region that is located at a same location in a previous picture as the location of the static region in the current picture and the previous picture precedes the current picture in a compression order. For example, the second QP can be QP2 that was used for compressing static regions of picture 730. In other embodiments, the second QP is assigned a high value (e.g., 51) that is applied when the quality compression of a static region is not to be improved.

Figure 11:
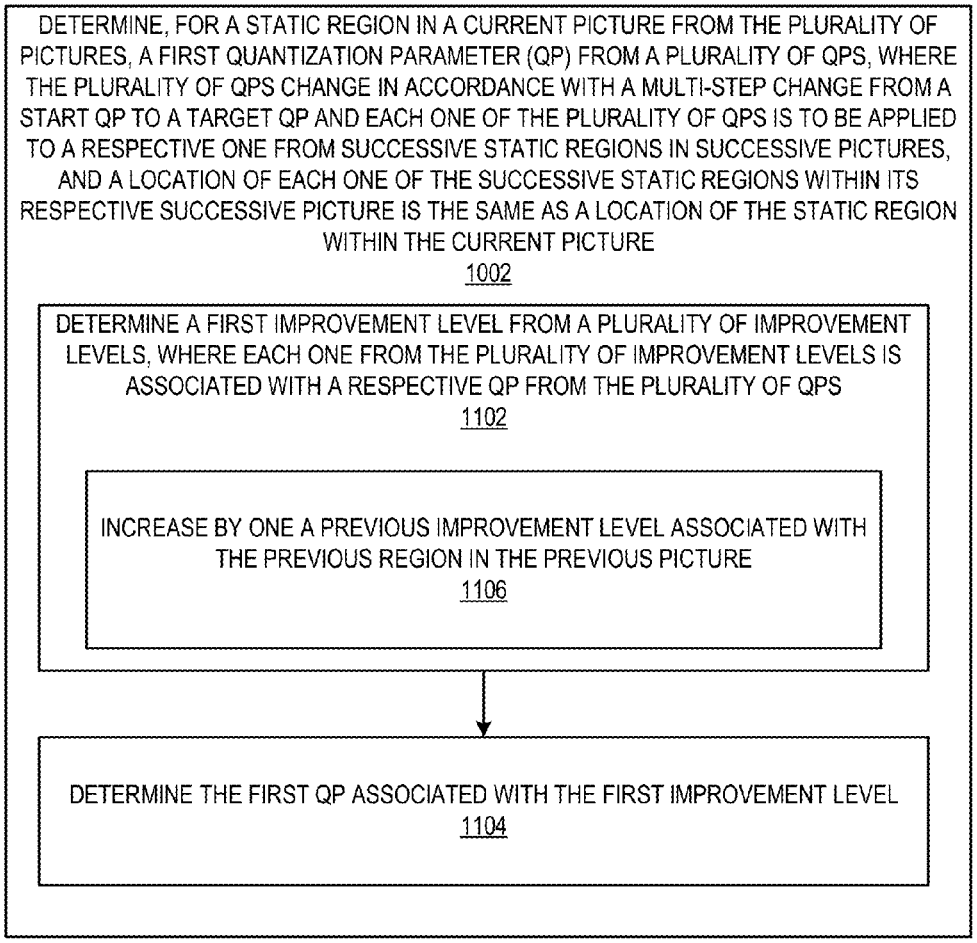
FIG. 11 illustrates a flow diagram of exemplary operations performed when quantization parameters are associated with improvement levels in accordance with some embodiments.

FIG. 11 illustrates a flow diagram of exemplary operations performed when quantization parameters are associated with improvement levels in accordance with some embodiments. In these embodiments, the operations of determining a first quantization parameter for a static region includes operation 1102, at which a first improvement level from a plurality of improvement levels is determined. Each improvement level from the plurality of improvement levels is associated with a respective QP from the plurality of QPs. For example, when the quality compression of a region is increased this is performed by increasing (operation 1106) by one a previous improvement level associated with the region in the previous region. In some embodiments, the determination of the first improvement level is performed during a prediction operation (e.g., within the MAQ unit 310 of the prediction module 202) of a compressing process of the static region. In other embodiments, the determination of the first improvement level is performed during a transformation operation (e.g., within transformation module 204) of the compressing process of the static region. Flow then moves to operation 1104, at which the first QP is determined to be associated with the first improvement level.

The embodiments described present various mechanisms which enable control over compression bandwidth usage. They enable the compression bandwidth usage to remain stable and constant, by spreading the improvement of the compression quality over multiple pictures as well as controlling the number of regions of which the compression quality is improved within a single picture.

Motion-Based Adaptive Quantization with Intra Prediction Mode:

In some embodiments, regions are encoded according to an intra prediction mode on a regular basis in order to eliminate potential corruption when transmitting or decoding a picture. In some embodiments, when the MAQ mode is enabled and a static region is to be compressed according to an intra prediction mode (which is referred to herein as an Intra static region), the QP value of the intra static region is determined to match the minimum QP assigned to the previous static regions preceding the intra static region in the compression order. This causes, the codec 102 to keep the quality improvement brought by the MAQ processing.

A method and apparatus for compressing a data stream comprising a plurality of pictures are described. A first quantization parameter (QP) from a plurality of QPs is determined for a static region in a current picture from the plurality of pictures. The plurality of QPs changes in accordance with a multi-step change from a start QP to a target QP and each one of the plurality of QPs is to be applied to a respective one from successive static regions in successive pictures. The location of each one of the successive static regions within its respective successive picture is the same as a location of the static region within the current picture. In response to determining that the static region is to be compressed based upon an inter prediction mode, compression of the static region based upon the first QP is caused. Alternatively, in response to determining that the static region is to be compressed based upon an intra prediction mode, compression of the static region based upon a minimum QP from the plurality of QPs is caused. The minimum QP has a value that is smaller or equal than each one of a subset of QPs from the plurality of QPs which were selected to respectively compress one or more previous regions in one or more previous pictures preceding the current picture in a compression order.

In some embodiments, when a static I-Slice type static region is detected, the quantization parameter to compress the static I-Slice type static region is determined as the lowest QP associated with the preceding static regions. FIG. 12A illustrates an exemplary table including quantization parameters and associated minimum QP that can be used to compress an Intra static region in accordance with some embodiments. The table of FIG. 12A includes a set of QPs that change in accordance with a multi-step change from the start QP (QPstart=45) to the target QP (QPtarget=20). The multi-step change further includes QPend. The QPs decrease from the QPstart to the QPtarget. Each QP from the multi-step change is used to compress a respective portion of successive pictures, when the portions remain static. In one embodiment, each QP is associated with the minimum QP among the QPs used to compress preceding static portions. In the example of FIG. 12A, when a portion is to be compressed according to QP2, the minimum QP is the lowest QP among the subset of QPs used for processing preceding portions without including the current QP (i.e., QP2 in this case). In this example, the minimum QP is QP1. In another embodiment, each QP is associated with the minimum QP among the QPs used to compress preceding static portions as well as the current QP. In this example, when a portion is to be compressed according to QP2, the minimum QP is the lowest QP among the subset of QPs used for processing preceding portions while including the current QP (i.e., QP2 in this case). Therefore, in this example, the minimum QP is QP2.

In the embodiments where each quantization parameter is associated with an improvement level, the improvements levels are associated with the quantization parameters according to a table of correspondence as described above. In some of these embodiments, the Nth improvement level is associated with the highest possible value of QP (e.g. 51) or a relative maximum value such as this value is the maximum QP possible for regions of a given picture. The N−1th improvement level is associated with a target QP for optimized quality. The initial improvement level '0' is associated with a base QP assigned to all regions with motion. In some embodiments, when a static I-Slice type region is detected and its associated improvement level is determined, the quantization parameter associated with the improvement level may be picked as the lowest QP associated with the preceding improvement levels.

FIG. 12B illustrates an exemplary table including improvement levels, quantization parameters and associated minimum QP that can be used to compress an Intra region in accordance with some embodiments. The table of FIG. 12B includes a set of QPs that change in accordance with a multi-step change from the start QP (QPstart=45) to the target QP (QPtarget=20). The multi-step change further includes QPend. The improvement levels are associated with a subset of decreasing QPs (i.e., the QPs associated with levels 1, 3, and 5) alternating with levels associated with high value QPs (i.e., levels 2, 4, and 6). Each QP from the multi-step change is used to compress a respective portion of successive pictures, when the portions remain static from a picture to the next picture. In one embodiment, each improvement level is associated with the minimum QP among the QPs used to compress preceding static portions. In the example of FIG. 12A, when a portion is to be compressed according to the quantization parameter of improvement level 2, the minimum QP is the lowest QP among the subset of QPs used for processing preceding portions while including the current QP (i.e., QP of level 2 in this case). In this example, the minimum QP is the QP associated with improvement level 1 (i.e., 40). In another embodiment, each improvement level is associated with the minimum QP among the QPs used to compress preceding static portions without the current QP. In this example, when a portion is to be compressed according to improvement level 3, the minimum QP is the lowest QP among the subset of QPs used for processing preceding portions without including the QP of the current improvement level (i.e., Level 3 in this case). Therefore, in this example, the minimum QP is the quantization parameter associated with level 1 (i.e., 40).

In some embodiments, an additional negative offset is added to the selected minimum QP value. This offset reduces the value of the minimum QP to compensate for the different compression efficiency between intra regions and inter regions (i.e., regions compressed according to inter prediction mode). Thus, in these embodiments, the final QP obtained for processing an Intra static region is slightly smaller than the minimum QP. This results in enabling compression of the Intra static region at substantially the same quality as the previous static region compressed.

In some embodiments, various mechanisms can be used to determine the minimum QP for compressing an Intra static region. For example, the MAQ unit 310 may determine for each region (1) an associated quantization parameter from the set of quantization parameters (i.e., the stepwise progression of QPs) as well as (2) a corresponding minimum QP value associated with this region. The minimum QP value is then stored in memory (e.g., memory 104) with the quantization parameter (or alternatively the corresponding improvement level) for the region. Based upon whether the static region is to be compressed in intra prediction mode or in inter prediction mode, the minimum QP is used to encode the region or the associated QP is used respectively.

In another embodiment, the MAQ unit 310 may be operative to determine whether the region is to be coded according to the intra prediction mode or not and instead of storing for each region a corresponding QP/improvement level and a minimum QP, it determines at the time of processing of the region that the minimum QP is to be used and therefore only stores in memory the minimum QP to be used as the QP for encoding the region. In all embodiments, when a static region is determined to be in an intra prediction mode, the transformation module 204 processes the region according to the minimum QP associated with that region. In some embodiments, the minimum QP is different from the associated quantization parameter of the region that would have been selected, by the MAQ mechanisms, from the set of QPs that change in accordance to the step-wise change from the start QP to the target QP.

The operations in the flow diagram of FIG. 13 will be described with reference to the exemplary embodiments of FIGS. 1-12B. However, it should be understood that the operations of the flow diagram can be performed by embodiments of the invention other than those discussed with reference to these FIGS. 1-12B, and the embodiments of the invention discussed with reference to FIGS. 1-12B can perform operations different than those discussed with reference to the flow diagram.

Figure 13:
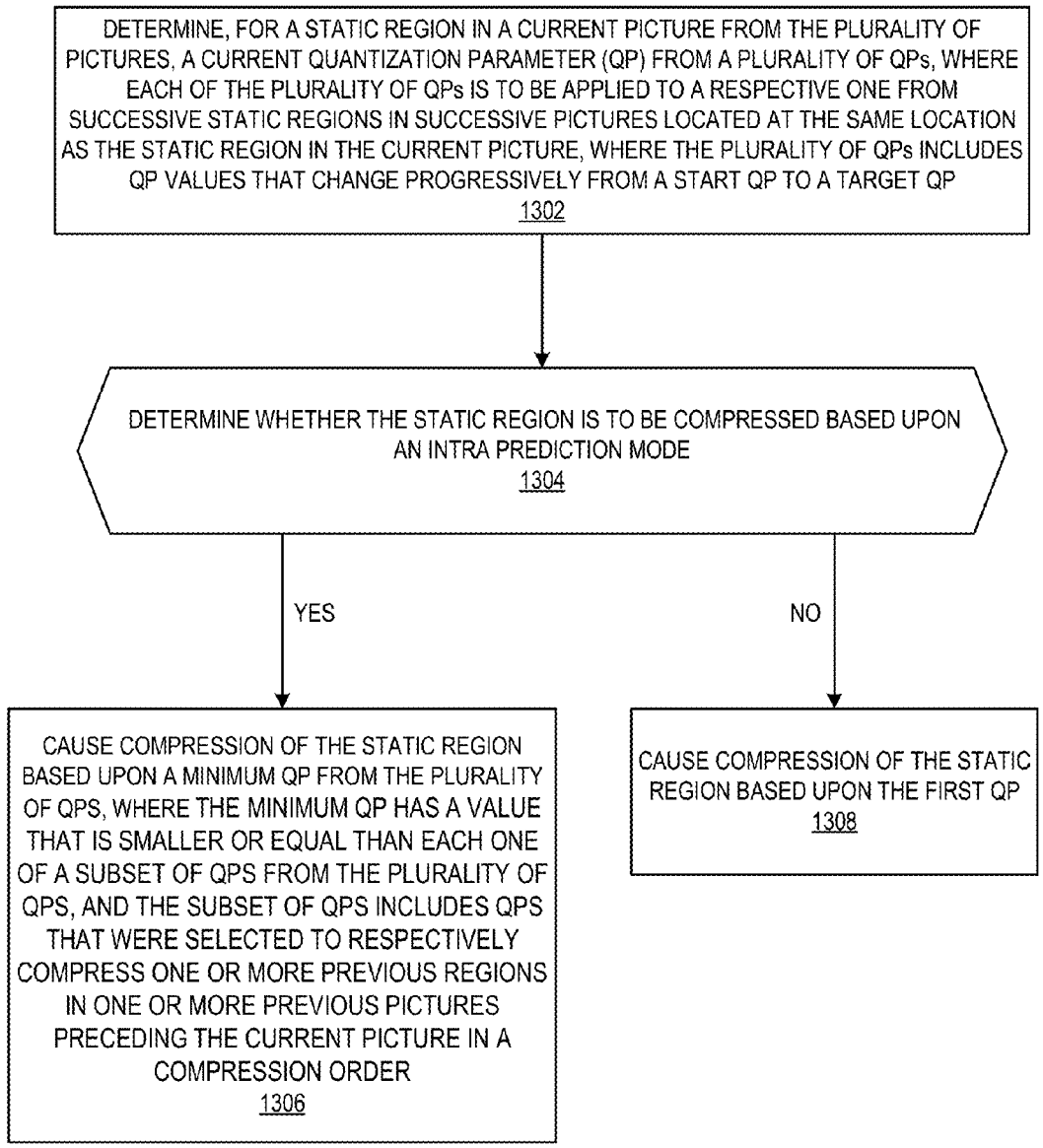
FIG. 13 illustrates a flow diagram of exemplary operations for compressing a data stream comprising a plurality of pictures, in accordance with some embodiments.

FIG. 13 illustrates a flow diagram of exemplary operations for compressing a data stream comprising a plurality of pictures, in accordance with some embodiments. At operation 1302, a first quantization parameter (QP) from a plurality of QPs, is determined for a static region in a current picture from the plurality of pictures. For example, the MAQ unit 310 determines a first quantization parameter from a set of quantization parameters (e.g., as illustrated in FIGS. 12A-12B) to be used for compressing a static region from the current picture. The plurality of QPs change in accordance with a multi-step change from a start QP to a target QP and each one of the plurality of QPs is to be applied to a respective one from successive static regions in successive pictures (e.g., as illustrated in FIGS. 12A-12B). A location of each one of the successive static regions within its respective successive picture is the same as a location of the static region within the current picture (as described, for example, with reference to FIG. 4B).

Flow then moves to operation 1304, at which the codec 102 determines whether the static region is to be compressed based upon an intra prediction mode. In response to determining that the static region is to be compressed based upon an intra prediction mode, the flow moves to operation 1306, at which compression of the static region based upon a minimum QP from the plurality of QPs is caused. The minimum QP has a value that is smaller or equal than each one of a subset of QPs from the plurality of QPs which were selected to respectively compress previous regions in previous pictures. The previous pictures preceding the current picture in the compression order. Alternatively, in response to determining that the static region is to be compressed based upon an inter prediction mode, the flow moves to operation 1308, at which compression of the static region is caused based upon the first QP.

The embodiments of the present invention present a mechanism for encoding intra static regions in a MAQ process, while ensuring that these regions are compressed at substantially the same compression quality as a preceding static region.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Furthermore, the data paths may be communication paths, communication links, data buses, and any other type of connection that allows the transfer of data. For example, in some embodiments, a data path may represent a plurality of communication buses. The data paths may be bi-directional or uni-directional and may carry instructions, commands, handshake signals, requests and/or control information. Additional data paths to those shown in the figures may also be provided between the various components of the system 100. The structure illustrated is thus provided for efficiency of teaching the present embodiment.

It should be noted that the present invention can be carried out as a method and can be embodied in a system or on a computer readable medium. The embodiments of the invention described above are intended to be exemplary only. The scope of the invention is therefore intended to be limited solely by the scope of the appended claims.

What is claimed is:

1. A method for compressing a data stream comprising a plurality of pictures, the method comprising:
   selecting, for a static region in a current picture from the plurality of pictures, a first quantization parameter (QP) from a plurality of QPs, wherein the plurality of QPs change in accordance with a multi-step change from a start QP to a target QP and each one of the plurality of QPs is to be applied to a respective one from successive static regions in successive pictures, and a location of each one of the successive static regions within its respective successive picture is the same as a location of the static region within the current picture;
   selecting one of an inter prediction mode and an intra prediction mode for compressing the static region, wherein when the intra prediction mode is selected information contained only within the current picture is used for compression of the static region;
   in response to selecting an inter prediction mode for compression of the static region, causing compression of the static region based upon the first QP; and
   in response to selecting an intra prediction mode for compression of the static region, causing compression of the static region based upon a minimum QP from the plurality of QPs, wherein the minimum QP has a value that is smaller than or equal to each one of a subset of QPs from the plurality of QPs, and the subset of QPs includes QPs that were selected to respectively compress one or more previous regions in one or more previous pictures preceding the current picture in a compression order.

2. The method of claim 1, wherein each one of the previous pictures includes a respective previous region from the previous regions that is located at the same location as the static region in the current picture.

3. The method of claim 2, wherein determining the first QP includes:
   determining a first improvement level from a plurality of improvements levels, wherein each one from the plurality of improvement levels is associated with a respective QP from the plurality of QPs; and
   determining that the first QP is associated with the first improvement level.

4. The method of claim 3, wherein determining the first improvement level includes increasing by one a previous improvement level associated with the previous region in the previous picture.

5. The method of claim 3, wherein determining the first improvement level is performed during a prediction operation of a compressing process of the static region.

6. The method of claim 1, wherein the subset of QPs further includes the first QP and the minimum QP has a value that is smaller or equal than each one the first QP and the QPs from the subset.

7. The method of claim 1, wherein causing compression of the static region based upon a minimum QP from the plurality of QPs includes determining an updated QP that is a sum of the minimum QP and a negative offset, and compressing the static region based upon the updated QP.

8. A non-transitory computer readable storage medium that provides instructions, which when executed by a processor, cause said processor to perform operations comprising:
- selecting, for a static region in a current picture from a plurality of pictures, a first quantization parameter (QP) from a plurality of QPs, wherein the plurality of QPs change in accordance with a multi-step change from a start QP to a target QP and each one of the plurality of QPs is to be applied to a respective one from successive static regions in successive pictures, and a location of each one of the successive static regions within its respective successive picture is the same as a location of the static region within the current picture;
- selecting one of an inter prediction mode and an intra prediction mode for compressing the static region, wherein when the intra prediction mode is selected information contained only within the current picture is used for compression of the static region;
- in response to selecting an inter prediction mode for compression of the static region, causing compression of the static region based upon the first QP; and
- in response to selecting an intra prediction mode for compression of the static region, causing compression of the static region based upon a minimum QP from the plurality of QPs, wherein the minimum QP has a value that is smaller than or equal to each one of a subset of QPs from the plurality of QPs, and the subset of QPs includes QPs that were selected to respectively compress one or more previous regions in one or more previous pictures preceding the current picture in a compression order.

9. The non-transitory computer readable storage medium of claim 8, wherein each one of the previous pictures includes a respective previous region from the previous regions that is located at the same location as the static region in the current picture.

10. The non-transitory computer readable storage medium of claim 9, wherein determining the first QP includes:
- determining a first improvement level from a plurality of improvements levels, wherein each one from the plurality of improvement levels is associated with a respective QP from the plurality of QPs; and
- determining that the first QP is associated with the first improvement level.

11. The non-transitory computer readable storage medium of claim 10, wherein determining the first improvement level includes increasing by one a previous improvement level associated with the previous region in the previous picture.

12. The non-transitory computer readable storage medium of claim 10, wherein determining the first improvement level is performed during a prediction operation of a compressing process of the static region.

13. The non-transitory computer readable storage medium of claim 8, wherein the subset of QPs further includes the first QP and the minimum QP has a value that is smaller or equal than each one the first QP and the QPs from the subset.

14. The non-transitory computer readable storage medium of claim 8, wherein causing compression of the static region based upon a minimum QP from the plurality of QPs includes determining an updated QP that is a sum of the minimum QP and a negative offset, and compressing the static region based upon the updated QP.

* * * * *